United States Patent
Lacey et al.

[11] Patent Number: 6,163,939
[45] Date of Patent: Dec. 26, 2000

[54] MOLDING OF FASTENING HOOKS AND OTHER DEVICES

[75] Inventors: Thomas G. Lacey, Derry; George A. Provost, Litchfield; Scott M. Filion, Newmarket; Evangelos Kaparis, Manchester; Clinton Dowd; James Van Stumpf, both of Goffstown, all of N.H.; Mark Joseph Condon, Reading, Mass.; Samuel White Pollard, Durham, N.H.; Stephen C. Jens, Winchester, Mass.; Peter E. Grulke, Fremont, N.H.

[73] Assignee: Velcro Industries, B.V., Netherlands Antilles

[21] Appl. No.: 09/194,898

[22] PCT Filed: Jun. 6, 1997

[86] PCT No.: PCT/US97/09868

§ 371 Date: Mar. 17, 1999

§ 102(e) Date: Mar. 17, 1999

[87] PCT Pub. No.: WO97/46129

PCT Pub. Date: Dec. 11, 1997

Related U.S. Application Data

[63] Continuation-in-part of application No. 08/659,368, Jun. 6, 1996, Pat. No. 5,900,350.

[51] Int. Cl.$^7$ .................................................. A44B 18/00
[52] U.S. Cl. .............................................. 24/452; 24/450
[58] Field of Search ..................... 24/442–452; 428/100

[56] References Cited

U.S. PATENT DOCUMENTS

| | | |
|---|---|---|
| 3,312,583 | 4/1967 | Rochlis . |
| 3,752,619 | 8/1973 | Menzin et al. . |
| 3,879,835 | 4/1975 | Brumlik . |
| 3,913,183 | 10/1975 | Brumlik . |
| 4,725,221 | 2/1988 | Blanz . |
| 4,775,310 | 10/1988 | Fischer . |
| 4,984,339 | 1/1991 | Provost et al. . |
| 5,058,247 | 10/1991 | Thomas et al. . |
| 5,116,563 | 5/1992 | Thomas et al. . |
| 5,131,119 | 7/1992 | Murasaki et al. . |
| 5,315,740 | 5/1994 | Provost et al. . |
| 5,339,499 | 8/1994 | Kennedy et al. . |
| 5,348,616 | 9/1994 | Hartman et al. . |
| 5,538,674 | 7/1996 | Nisper . |
| 5,604,963 | 2/1997 | Akeno . |

OTHER PUBLICATIONS

"What is the Photo Chemical Machining Process and What Can It Do For You?", *Photo Chemical Machining Institute* San Clemente, CA.

Bennett, R.J., "Photo–Chemical Machining Fundamentals—With Three Unique Applications", *Technical Paper*, Creative Manufacturing Engineering Programs, Society of Manufact. Engineers, Dearborn, Michigan, 1976.

Freidman, H., "Manufacturing Metal Parts by the Photo–Chemical Maching Proces", Conference Proceedings, Nontraditional Maching, Cincinnatti, Ohio, 2–3 Dec. 1985, Carl Wegner, Chairman.

*Primary Examiner*—James R. Brittain
*Attorney, Agent, or Firm*—Fish & Richardson P.C.

[57] ABSTRACT

Methods of forming mold cavities (1) suitable for hook and loop fastening (100), along with effective hook construction and hook and loop fastener products that have an ultrathin cross section (118). Photochemical techniques are employed to form plates (250) that define hook-form mold cavities (1), and, alternatively, chemical etching is employed following preforming of the cavities and machining. Included are hooks having three-dimensional tapers with enhanced loop engaging characteristics. By utilization of special surface finishes and tolerances, hook fasteners, having ultrathin cross sections (118) are realized, that pave the way for practical use of touch fasteners in a wide range of new areas.

20 Claims, 25 Drawing Sheets

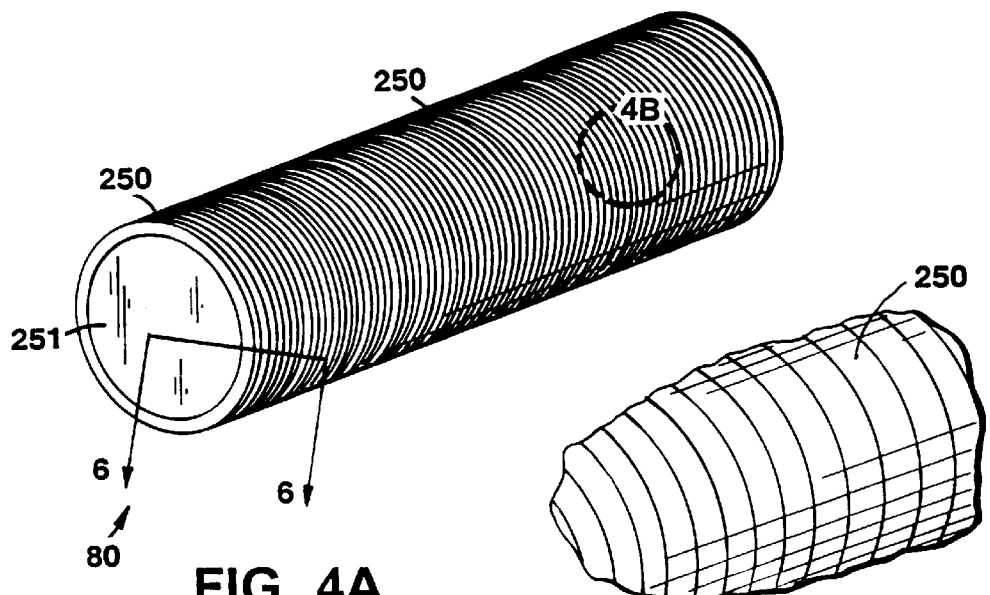
FIG. 4A
FIG. 4B
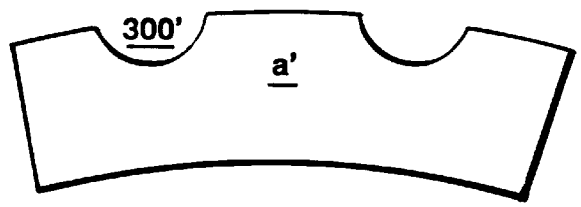
FIG. 8A
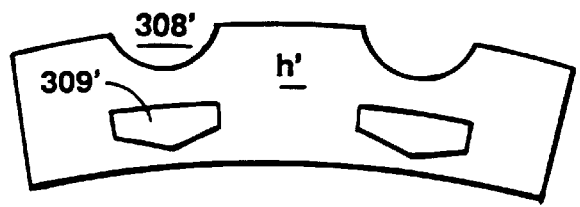
FIG. 8B

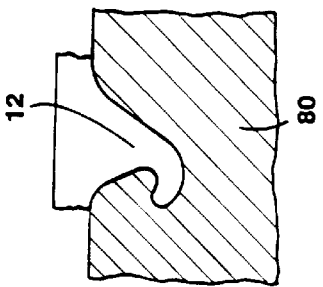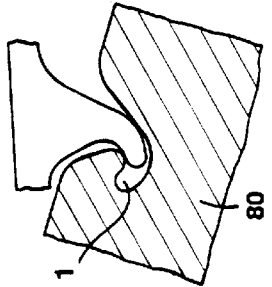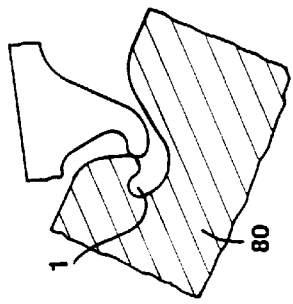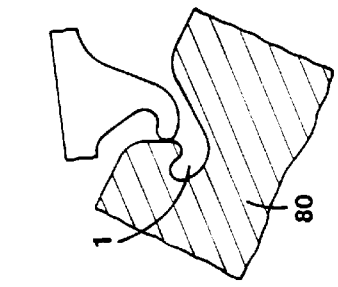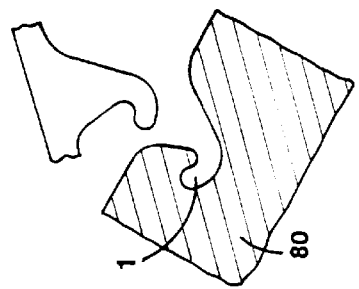
FIG. 5A
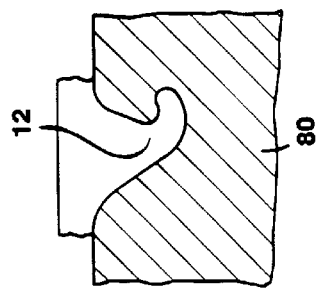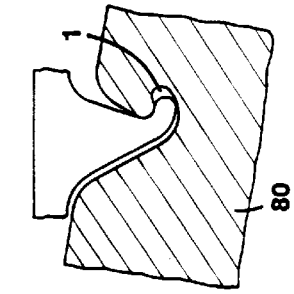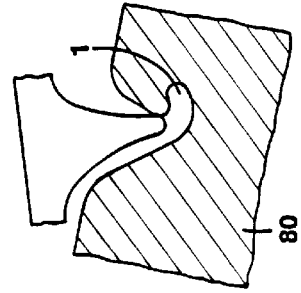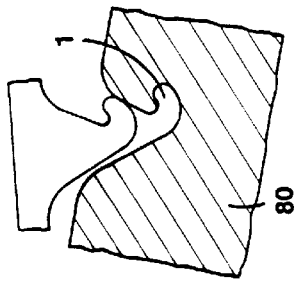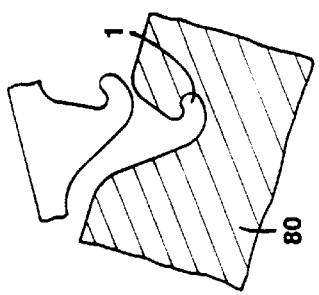
FIG. 5B

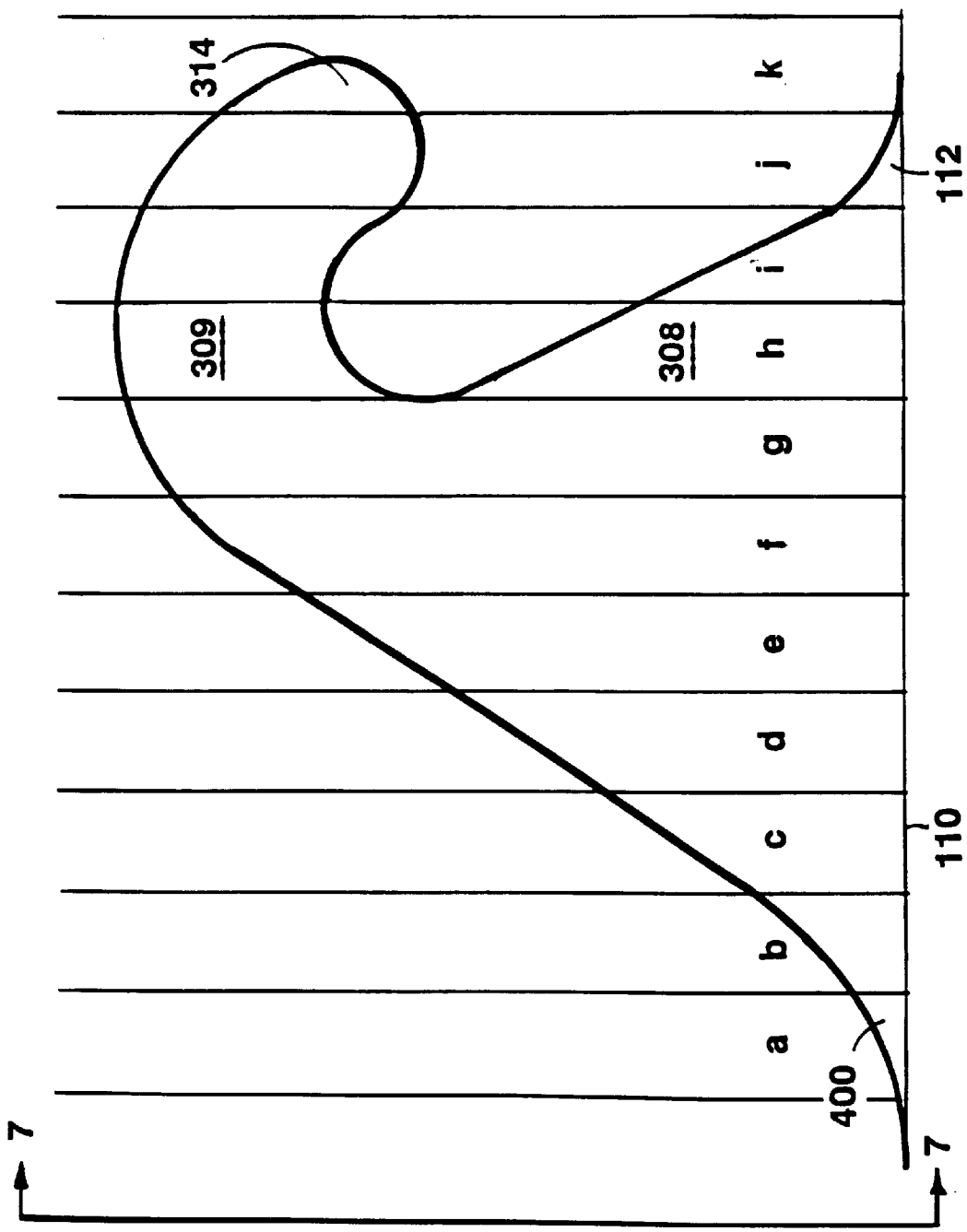

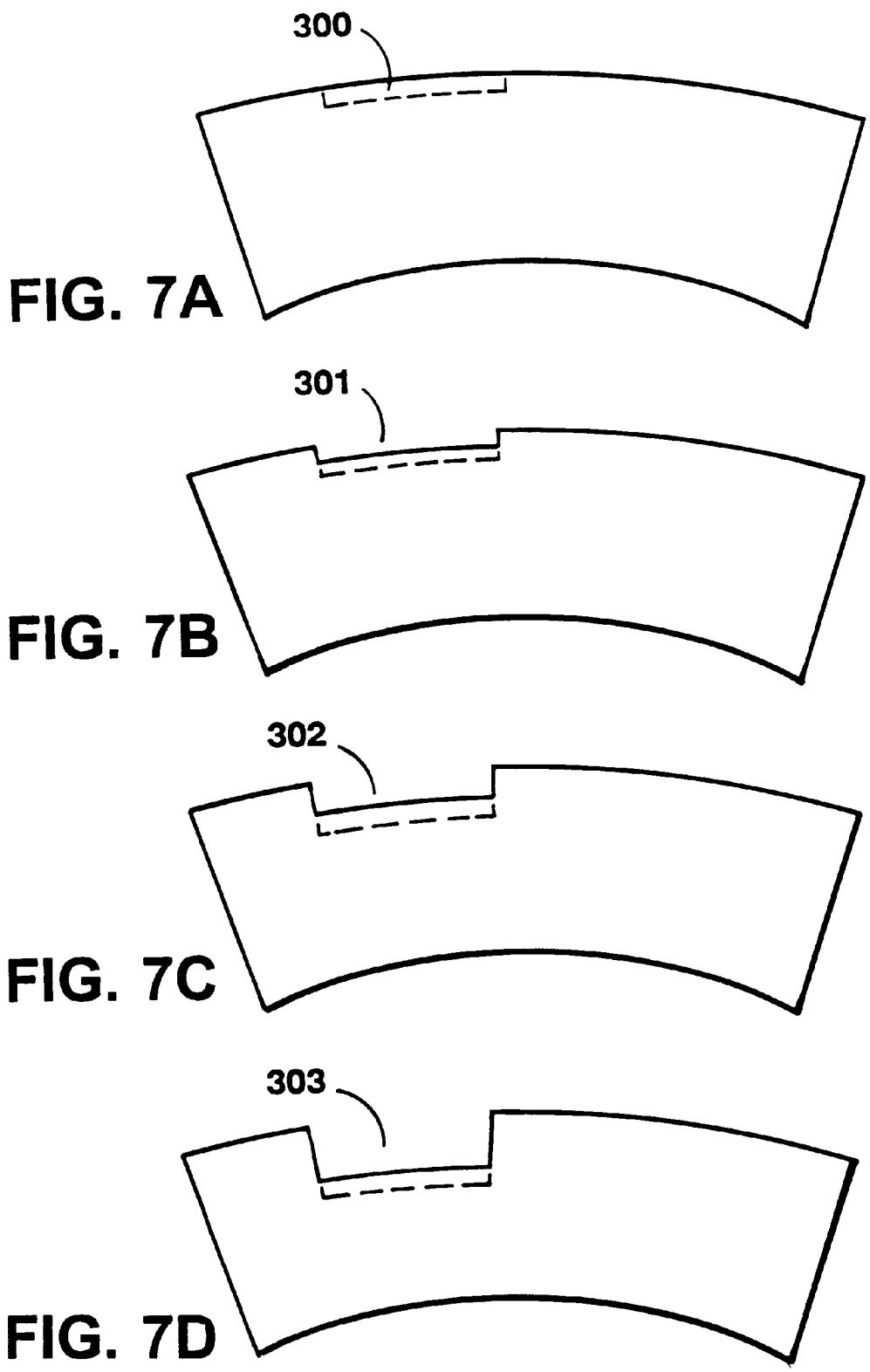

FIG. 10C
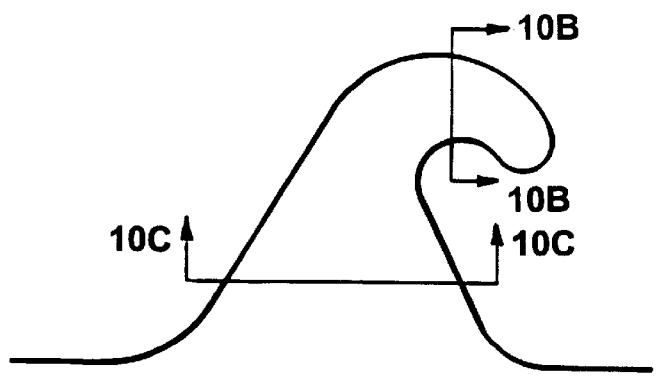
FIG. 10B
FIG. 10A

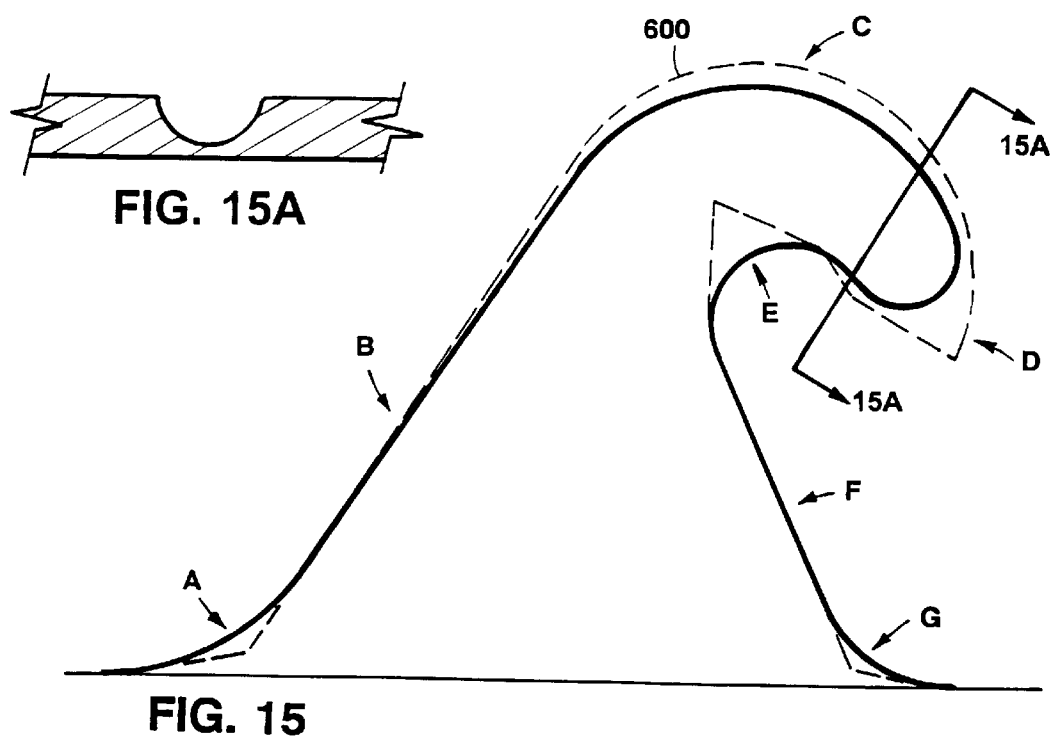
FIG. 15A
FIG. 15
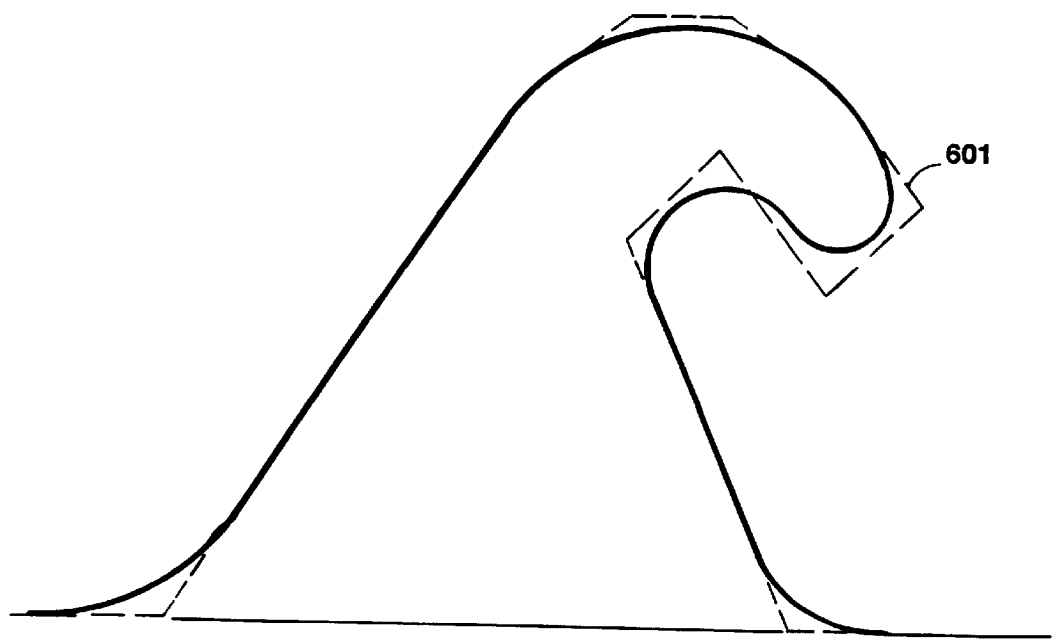
FIG. 16

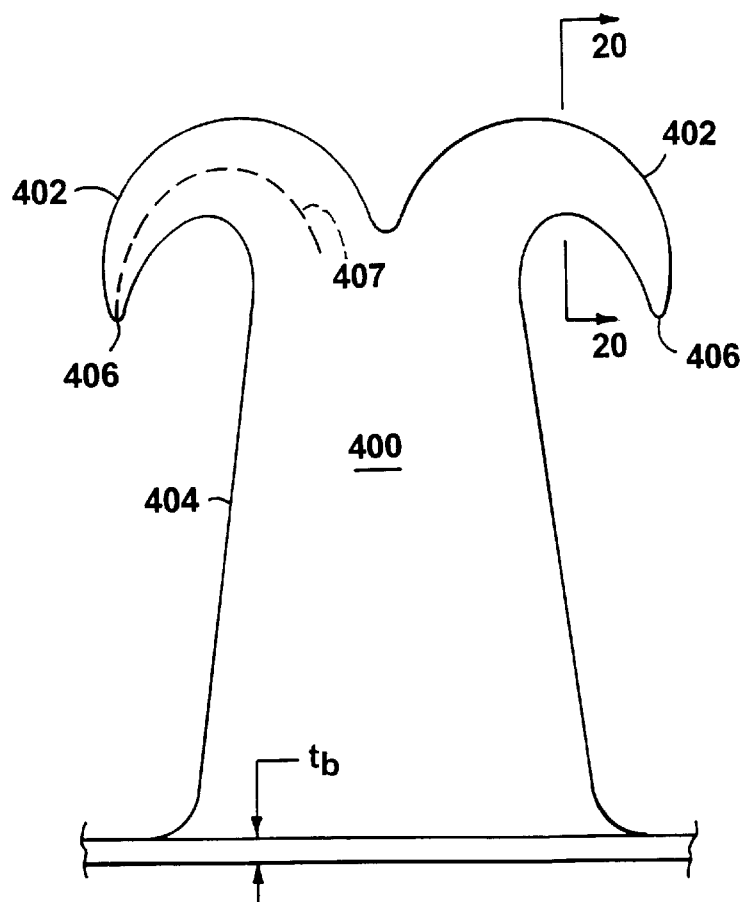
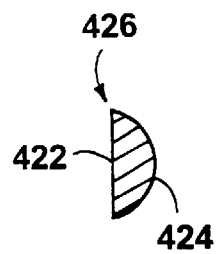
FIG. 20
FIG. 20A
FIG. 18

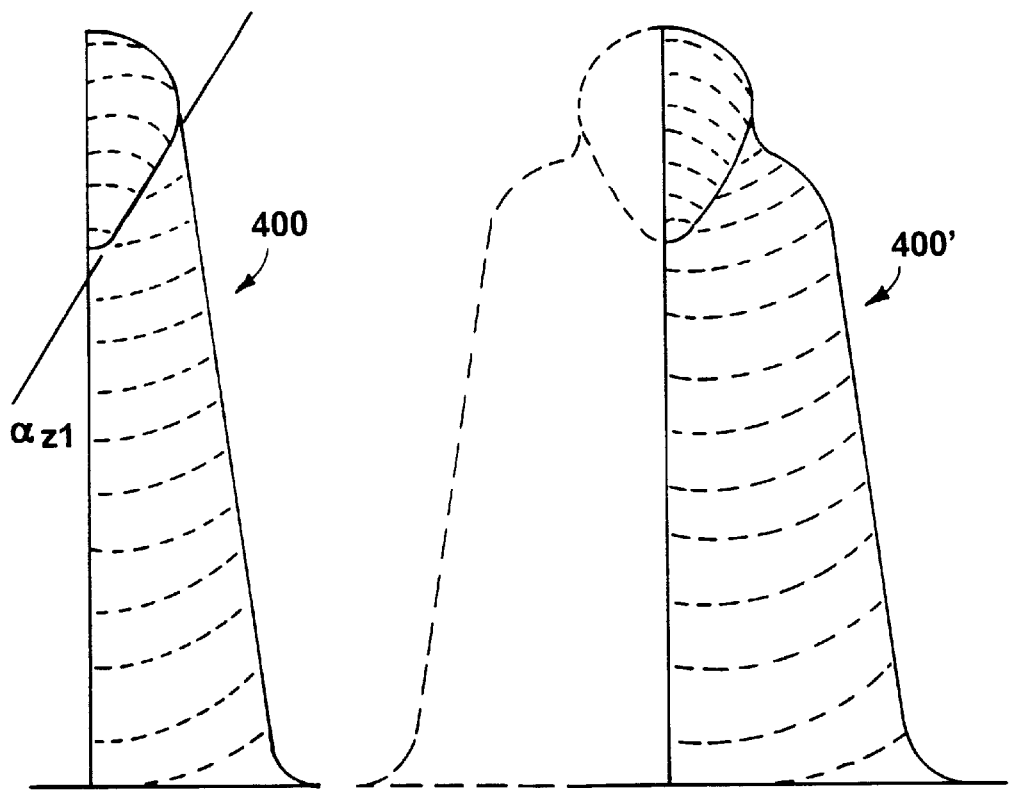
FIG. 21  FIG. 21B
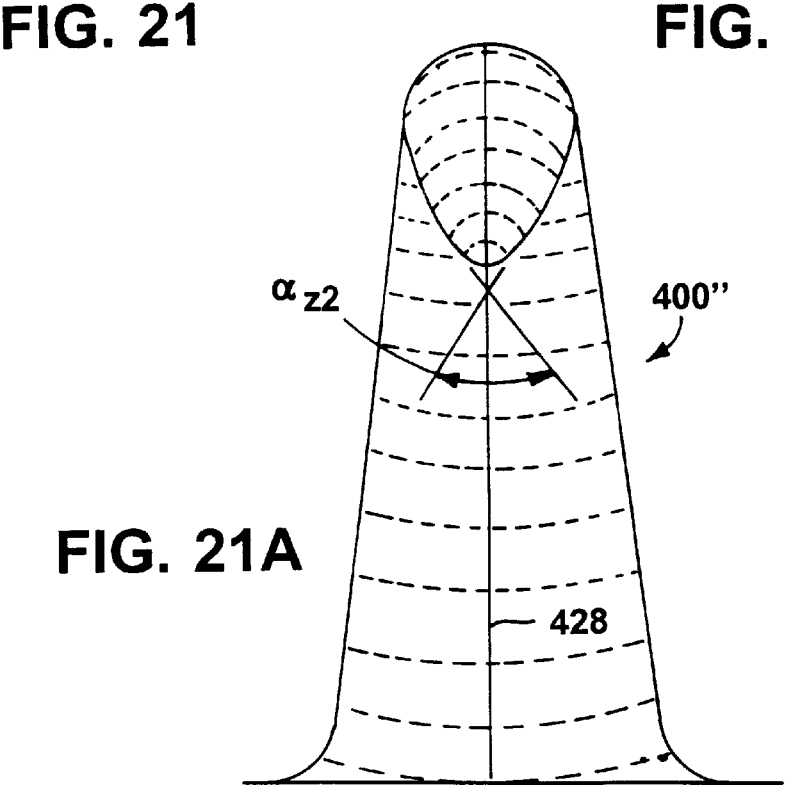
FIG. 21A

MOLDING OF FASTENING HOOKS AND OTHER DEVICES

This application is a continuation-in-part of application Ser. No. 08/659,368, filed Jun. 6, 1996, now U.S. Pat. No. 5,900,350.

BACKGROUND OF THE INVENTION

This invention relates to molding methods, apparatus and products especially hook fasteners for engaging loops.

In the field of molded hook fasteners, typically a series of adjacent rows of hooks forms one side or element of a fastener closure and a mating element provides loops or anchored fibers with which the hooks engage.

A fastener element with rows of hook members is typically formed with a molding tool that has no moving parts. The hooks are pulled from their mold cavities by distorting the hooks. For molding continuous strips of such hook members a rotating mold roll is employed, while for discrete items injection molding techniques are employed. Improvements applicable to such molds and to the processes of molding these hook members may be useful in molding other products.

SUMMARY OF THE INVENTION

Important aspects of the invention concern molding a multiplicity of devices, especially fasteners and in particular, touch fastener hooks extending from a common base, by use of a large multiplicity of mold plates held face to face, the method comprising forming mold cavities of the shape of the devices in the edges of the mold plates, assembling the plates face-to-face to provide a mold surface, the sides of some of the plates closing cavities in the sides of other of the plates, positioning the mold surface opposite another surface with a gap (G) therebetween, filling the volume between the mold surface and the opposed surface with molten resin, and, after hardening of the resin, withdrawing the molded devices and integral base from the mold surface.

According to an important aspect of the invention, the mold cavities are formed by photochemical techniques employing, upon the sides of the plates, a mask, the shape of which approximates, but varies from, the desired profile of the devices or a portion of the device to be molded to compensate for nonuniformities of a predetermined etching process, and with the predetermined process, etching the exposed metal of the plate as defined by the mask to provide the desired mold cavity.

According to another aspect of the invention, a plurality of plates are etched using corresponding masks to form a single device or fastener and the plates are assembled in registry with one another. Preferably at least some of the plurality of plates are laminated together to form a thicker plate assembly.

According to another feature, at least two of the plates have mating mold cavity portions that together define a relatively sharp point, in the case of a hook component of a hook and loop fastener, the sharp point residing on a portion of the hook exposed to engage loops or fibers of a mating component.

Preferably, in certain cases the sharp point is defined at the top of the hook, positioned to be the first portion of the hook to contact the loop or fibers of a loop component against which the hook component moves face-wise; in other cases the sharp point is at the distal tip of a crook of the hook, for engaging a loop and directing it into a loop capture area of the hook.

Preferably, in the latter case, the tip portion of the crook lies within an included angle $\alpha$ of less than 30 degrees. In certain preferred cases the forming method is adapted to produce a tip that tapers to a relatively sharp point in both end and side views.

According to one embodiment the mold cavity defines a hook component of a hook and loop fastener. The hook component has a crook ending in a distal tip, the edge or edges of the mask defining the distal tip being oversized and the edge or edges of the mask defining the concave curve being undersized. The inner surface of the crook is concave and encloses a loop capture area. The edge or edges of the mask defining the concave curve are undersized while the upper edge of the crook is convex and the edge or edges of the mask defining this convex edge are oversized.

According to another aspect of the invention, the hook component has a crook portion ending in a distal tip, the tip directed toward the base. The crook has a concave inner surface that defines an apex substantially closer to the stem or pedestal of the hook than to the tip.

According to another embodiment the mask defines a hook. The tip portion of the crook of the hook, in x-y profile, is substantially pointed, defining an included angle of less than about 30°. The neutral axis of the crook in the tip portion is directed substantially downward toward the base. The curvature of the concave inner-surface of the crook decreases in radius proceeding from the tip along the curved surface toward the apex, and the apex of the hook capture area is located laterally closer to the stem or pedestal than to the tip of the crook portion.

According to another important aspect of the invention in which the mold cavity defines a hook component of a hook and loop fastener, (a) the edge surfaces of the plates directed toward the gap are formed to positional accuracy from part to part of at most ±0.001 inch at the edge of the plates and (b) the gap thickness ($t_b$) is less than about 0.003 inch, in certain preferred cases less than about 0.002 inch, whereby an ultrathin molded fastener tape is formed.

According to another important aspect of the invention the plates are comprised of a hardened copper alloy, preferably copper beryllium and in preferred cases alloys containing 1.9 percent beryllium, by weight.

According to another aspect of the invention the crook portion of the hook extends in a direction at an angle to the plane of the plates, the shape of the crook being defined by cut-outs in a plurality of plates.

Another feature is a mold in which a given plate has cavity portions formed in each of its sides, the cavities being offset from one another and overlapped in the manner that the combined depth of penetration of the cavities into the depth of the plate exceeds the plate thickness. In the case of hooks for a hook and loop fastener, the effective overlap of the cavities enables a high density of hooks to be achieved in the hook component.

According to another aspect of the invention the molten resin is introduced to the thus-formed mold from an extruder. In certain preferred cases the plates define a mold roll and a pressure roll defines a nip with the mold roll, the extruded plastic forming a dam of molten plastic at the nip. In another case a nozzle delivers molten resin under pressure from the extruder against the mold roll. In either case preferably cooling fluid cools the preferably copper based plates, as by circulating through the plates.

Another aspect of the invention is characterized in that the mold surface is formed by a chemical etchant to provide a surface roughness of less than about 75 microinches, in preferred cases less than about 60 microinches. In preferred embodiments of this aspect, the cavities are formed by photochemical techniques which produce the finished surface, the techniques producing an edge surface on the respective plates with a dimensional tolerance less than about 0.001 inch, in many cases less than about 0.0005 inch. In certain preferred instances the photochemical etching techniques are employed to form the cavities, following which the plates are assembled face-to-face and machined to a desired dimensional tolerance. Subsequently the plates, while remaining assembled, are etched to remove burrs extending into the mold cavities. In other cases the cavities of the plate are preformed by other techniques, the plates are assembled face-to-face and machined to a desired dimensional tolerance, and subsequently the plates, while remaining assembled, are etched to remove burrs extending into the mold cavities. In these cases, preferably the plates are of copper-beryllium, and the burrs, being work hardened, are preferentially removed by the etchant.

Another aspect of the invention is a molding apparatus for forming ultrathin hook components and the product itself. The molding apparatus comprises a series of mold plates held together face to face to define, at the edges of the plates, a series of mold cavities shaped to form fastener elements, and an opposed forming member, the edges of the plates and the surface of the opposed member defining a mold gap (G) in which a base layer, integral with the fastener elements, is formed when the mold cavities and the space between the edges of the plates and the opposed forming surface are filled with moldable resin. The apparatus is characterized in that (a) the edge surfaces of the plates directed toward the gap are formed to positional accuracy from part to part of at most 0.001 inch with respect to a mean value at the edge of the plates and (b) the gap thickness $t_b$ is less than 0.003 inch, whereby an ultrathin molded fastener tape is formed. In the preferred embodiment of the aspect the positional accuracy is at most 0.0005 inch and the mold plates comprise a hardened copper alloy, preferably a copper beryllium alloy, and, in certain instances, most preferably a copper alloy containing about 1.9 percent beryllium, by weight. In preferred embodiments the plates are circular, assembled in a stack to form a cylindrical mold roll, and the opposed member is constructed to apply molten plastic to the roll. Forming a nip with the mold roll into which nip molten plastic is introduced, the gap (G) between the mold and pressure rolls is less than about 0.003 inch to determine the thickness ($t_b$) of the base of the fastener. In other instances the opposed member comprises a surface of an extruder nozzle, the surface held from the mold roll at a gap (G) of less than about 0.003 inch to determine the thickness ($t_b$) of the base of the fastener. In other instances the opposed member defines with the plates an injection mold associated with an extruder.

In any of these instances, preferably the surfaces defining the fastener-form mold cavities have a surface roughness of less than about 75 microinches, in many instances less than about 60 microinches.

Preferably the mold cavities and the edge surfaces of the mold plates are formed by one of the techniques mentioned above, i.e. photochemical techniques with special masking compensation or forming by other techniques, that may include metal machining, followed by a light chemical etch that is found to effectively remove burrs from the mold cavities without detriment to the shape of the critical features of the cavities.

Another important aspect of the invention is a hook element for engaging a loop element, the hook element comprising a base and a large multiplicity of loop-engageable hooks molded integrally with the base, characterized in that the base comprises a plastic resin and has a thickness ($t_b$) of less than about 0.003 inch, preferably in many cases of less than about 0.002 inch. In preferred instances the hook component is molded of a thermoplastic material.

As mentioned previously an important form of touch fastener is characterized in that: (a) the crook portion, in the direction of extension of the crook, is substantially pointed, defining an included angle ($\alpha_{x,y}$) of less than about 30°, (b) the neutral axis of the crook portion is directed substantially and in certain instances, directly, downward toward the base at the crook tip, (c) the curvature of the inner surface of the crook portion decreases in radius from the tip to the apex, and (d) the apex of the hook capture portion is located laterally closer to the stem or pedestal than to the tip of the crook portion. Preferred forms of this aspect of the invention have the following features:

The apex of the loop capture area is spaced from the tip of the crook portion a distance ($\delta_1$) of more than about two-thirds, preferably more than about three fourths, of the lateral distance ($\delta_2$) from the outermost portion of the crook to the stem or pedestal.

The thickness of the crook portion out of the plane of the direction of extension of the crook tapers, narrowing toward the tip of the crook portion: preferably, in transverse profile, the tip is substantially pointed, defining an included angle ($\alpha_{z1}$) of less than about 30 degrees, and is directed substantially downwardly, directly toward the base.

In certain instances, in transverse profile, the crook portion has one side that is straight and one side that is convex, or in other instances, the crook portion has two sides that are oppositely convex. In each case the convex surfaces are curved in the manner to have cross-sections taken perpendicular to the neutral axis that are relatively thick at the axis and thinner toward the upper and lower edges of the crook.

The inner surface of the crook portion in the vicinity of the tip defines an angle ($\psi_1$) with a perpendicular to the base while the inner surface of the crook portion, from the tip to the apex, defines an overall inclination angle ($\psi$) with a perpendicular to the base.

In these embodiments, preferably the cross-sectional area of the crook portion, in planes perpendicular to the neutral axis of the crook portion, increases substantially linearly as a function of distance along the neutral axis from the tip, and the upper surface of the crook portion is substantially of wedge shape. In certain cases the wedge shape is defined by the intersection of a flat side of the crook portion and an oppositely directed convex side of the crook portion, while in other cases the wedge shape is defined by the intersection of two oppositely directed convex sides of the crook portion.

Also in preferred forms the inner surface of the crook portion is of substantially elliptical form, the major axis of the ellipse forming an angle with a normal to the base of more than 10 degrees and less than about 30 degrees.

In many cases preferably the molded hook is characterized in being of a form capable of being molded in a fixed mold and removed therefrom by pulling the hook from the cavity without opening or moving parts of the mold.

Other aspects of the invention concern the realization that molded fastener hooks with very small hooks (e.g., of height less than about 0.025 inch) can provide better engagement with low-lying loops or fibers of inexpensive fabrics because the probability is increased that each hook of a fastener will engage a loop or fiber.

There are a number of seemingly conflicting considerations that stand in the way of realizing this objective in a manner that provides highly effective fastening. As the hook members become smaller and thinner, they become more flexible. This increases the tendency for hooks under slight load to disengage from the mating fabric. It is usually important that such small hook members present a significant re-entrant crook, i.e., a hook tip that tilts downwardly, in order to better snag and retain the loops or fibers of the mating fabric. It also is important that the crook of the hook have a very low displacement volume to enable sufficient penetration into low loft fabrics to enable loop or fiber engagement. Crook displacement volumes, as defined below, of less than $1.0 \times 10^{-6}$ cubic inch and preferably about $0.5 \times 10^{-6}$ cubic inch or less are desired. It is of course also important that the peel and shear strengths of the overall fastener meet the strength demands of the conditions of use. Consequently, the hooks and the loops must have sufficient strength to maintain engagement but also sufficient flexibility to disengage without destroying the hooks or the loops.

The preferred known technique for making high performance hooks has been to employ molds that have no moving parts, but hooks of the size of interest here are especially difficult to achieve by such conventional techniques.

The present invention provides improved molds and techniques for making the hooks and other products, improved techniques for making the molds, and improved products.

According to one aspect of the invention we have realized that effective molded hook members of height less than 0.020 inch, that have efficient loop or fiber engaging crooks and displacement volumes of less than $1.0 \times 10^{-6}$ cubic inch and preferably about $0.5 \times 10^{-6}$ cubic inch or less (such hooks are sometimes referred to herein as microhooks), can be reliably produced at high speed and low cost by use of special shape parameters for the mold cavity in which the hook is formed.

A conventional mold cavity defines a hook profile consisting of a relatively short base or pedestal, a relatively elongated stem section, and a crook or return section. We have realized that an effective microhook can instead be formed by use of a mold cavity profile that is defined essentially by a pedestal portion to which a tapered crook portion is directly joined.

In a preferred microhook mold cavity, the base width and taper rate are also important. Preferably, the width of the base is at least about 100% of the overall hook height, more preferably at least about 110% or more. Preferably, the taper (rate of change of width relative to distance along the hook axis) of the hook cavity from its base at least to a level of half of the height of the hook cavity is greater than 0.6 to 1, more preferably greater than 0.8 to 1 and most preferably greater than 1.0 to 1.0.

In preferred profiles of this kind, the pedestal cavity has a much larger taper from its base to the midsection of the hook than the taper of the crook section. A pedestal taper of more than four times and preferably more than five times the taper of the crook portion is employed. In preferred implementations, the sides of the profile of the mold cavity are straight and a projection of the converging sides intersect at an apex angle of 40° or more, preferably, at least 50° and in the presently preferred implementation, 60°.

Such mold constructions produce hooks that are strong for their size and enable a high density of the hooks to be achieved.

Such mold constructions also enable the molded crook portion of the hook, after undergoing deformation during withdrawal from the fixed mold cavity, to be rapidly exposed to an expansion space that quickly gives room for the crook portion to recover toward its originally molded form.

By use of these novel mold cavity parameters, we realize that certain conditions in the molding of microhooks can be overcome. Immediately upon molding in a cooled mold, a hook has a memory for its initial molded condition. After being deformed the crook tends to return to the initial form. However, if a hook member has a significant crook, it cannot be withdrawn from a fixed mold unless it remains warm and readily deformable. To the extent the hook member cools while being withdrawn, a tendency is introduced for the hook to set in the deformed condition, and not return sufficiently to the designed crook shape.

These factors have been present in the molding of hook members of larger form, but have not appeared critical. We realize, however, that with microhooks, these factors can be more critical: because the very small crook tips have a significantly increased ratio of exposed cooling surface relative to mass, the fabric-engaging crooks tend to cool and set more quickly than do molded hook elements of the conventional larger form. With the novel mold cavity parameters provided by the present invention, the degree of setting in deformed state can be decreased because the relative duration of exposure of the hook member to the deformed condition is decreased. This enables effective production of microhooks having a high level of performance. We have realized that products made with the mold profile and techniques just described have other advantages, even where rapid recovery of the hook tip shape is not important. The wide based pedestal to which the crook is directly attached provides a profile with considerable strength in shear loading. Accordingly, the cross-row thickness of the hook can be less than the conventional thickness of 0.008 inch or more; preferably the hook has a thickness of 0.006 inch or less. Likewise the spacing between adjacent rows of hooks can be less than about 0.010 inch, preferably about 0.008 inch or less. Density of distribution of the hooks in the direction cross-wise to the direction of the rows of hooks of about 50 per inch or more can be advantageously achieved, preferably about 70 hooks per inch or more.

The smallness of the hooks also enables densities of distribution in the direction of the rows of hooks of about 20 hooks per inch or more, preferably about 25 hooks or more per inch.

In particular it becomes possible to mold highly effective hook members that have an areal density greater than 1000 hooks per square inch, and preferably greater than 1500 hooks per square inch. Hook members of such areal density and form have been found to have an aggregate strength effect that can meet the strength demands of many conditions of use, while providing a hook surface that is soft to the touch due to the aggregate surface effect provided by the closely adjacent hooks. The preferred downward orientation of the tips add to this effect. Each of these features makes the hook member useful on items that lie close to the skin.

When the molds are provided on a rotating molding roll, the mold profile of the invention enables particularly efficient production of running lengths of many closely spaced rows of high performance hook member. The invention is also useful for fixed molds for use in injection molding. Microhooks molds can advantageously be formed by use of photochemical milling techniques, which have unique advantages to the formation of molds for microhooks. They enable the production of hooks that are extremely small (less than 0.010 inch in height), so small that we term them "sub-microhooks". Furthermore, these techniques provide very smooth surfaces for the mold cavities. These have special usefulness to produce hooks for use with extremely low loft materials. In certain circumstances laser machining, Electrical Discharge Machining (EDM) and plating techniques can also be employed to form the molds for the unique products of the invention.

The fastener members of the invention can also be advantageously oriented at various angles to the machine direction of a mold roll, or of molds formed by face-to-face assembly of the molding plates, by aligning cut-outs or apertures in a number of adjacent plates to define the mold cavity.

According to one aspect of the invention, a mold for integrally forming from a moldable resin a large multiplicity of hook-shaped members on a sheet or strip-form base is provided. The mold has hook-shaped cavities located at the surface of the mold, at least many of the hook-shaped cavities having a tapered pedestal chamber and a crook chamber which are contiguous.

In preferred embodiments, the pedestal chamber has a base width greater than about the height of the hook-shaped cavity and at half height of the hook-shaped cavity, has a width equal to about half the height of the hook-shaped cavity or more.

An important feature of the invention is that lower portions of the pedestal chamber are substantially wider than the crook chamber, such that space is provided for a formed hook member to substantially recover the shape of the cavity before it is completely removed from the cavity.

In particular implementations, at least many of the hook-shaped cavities have a height less than about 0.015 inch, more preferably less than about 0.010 inch.

In certain embodiments, the mold is combined, at a molding station, with an extruder in the vicinity of the mold cavities for delivering molten resin to the cavities.

In some cases, means are included for applying pressure to the molten resin for promoting filling of the mold cavities. In some instances where the mold is a mold roll, the means for applying pressure includes a pressure roll. In other instances where the mold is a mold roll, the means for applying pressure includes a nozzle surface closely fitted to the roll for confining molten resin under pressure.

In some embodiments, at least some adjacent plates are laminated.

Preferably, the hook-shaped cavity is of form produced by photochemical machining.

In some key embodiments, the crook chamber of the hook-shaped cavity is set at an angle with respect to the plates. In other instances, the crook chamber is perpendicular to the plates.

For some applications, the hook-shaped cavities are arranged in a helical pattern about the mold roll.

According to another aspect of the invention, a molded hook fastener member of a hook and loop touch fastener is formed by the process of delivering a moldable, heated material to a mold according to the methods described above.

In some embodiments, the molded hook fastener member is molded in a single hook cavity formed by aligned cut-outs in at least three adjacent plates. Preferably, the cavity is defined by photochemically milled plates.

Preferably, the molded hook members have a height less than about 0.020 inch, a thickness of about 0.006 inch or less and are disposed on a sheet-form base at a density of at least 1200 molded hook members per square inch.

In some preferred embodiments, the molded hook member has a displacement volume of less than about $0.5 \times 10^{-6}$ cubic inches.

BRIEF DESCRIPTION OF THE DRAWING

FIG. 4A is a perspective view of a mold roll, in isolation. FIG. 4B is a close-up, section view of the surface of the mold roll.

FIGS. 5A and 5B are a series of side views showing a hook member being removed from a mold cavity in a mold roll, against and in the machine direction, respectively.

FIG. 6 is a cut-away view of a mold cavity formed by several adjacent plates.

FIGS. 7A–7K are side views of sections of the plates in FIG. 6, shown diagrammatically.

FIGS. 8A and 8B are side views of sections of the plates in FIG. 6, shown diagrammatically, in which the cut-outs have curved sides and a wedge is formed at the top of the cavity.

FIG. 10A is a side view of a hook member having a curved side. FIGS. 10B and 10C are cross-sectional views of the hook member shown in FIG. 10A.

FIGS. 15 and 16 are diagrammatic views of a mold cavity, and a s used to form the mold cavity by photochemical milling. FIG. 15A is a cross-sectional view of a cavity formed by photochemical milling.

FIG. 18 is a front elevational view of a dual hook, according to the invention.

FIG. 20 is a cross-sectional view taken along line 20—20 in FIG. 18 of a hook according to FIG. 21.

FIG. 20A is a cross-sectional view taken along line 20—20 in FIG. 18 of a hook according to FIG. 21A.

FIGS. 21, 21A and 21B are side elevational views of first, second and third embodiments of the hook of FIG. 18, respectively.

IMPLEMENTATIONS

Figure 1:
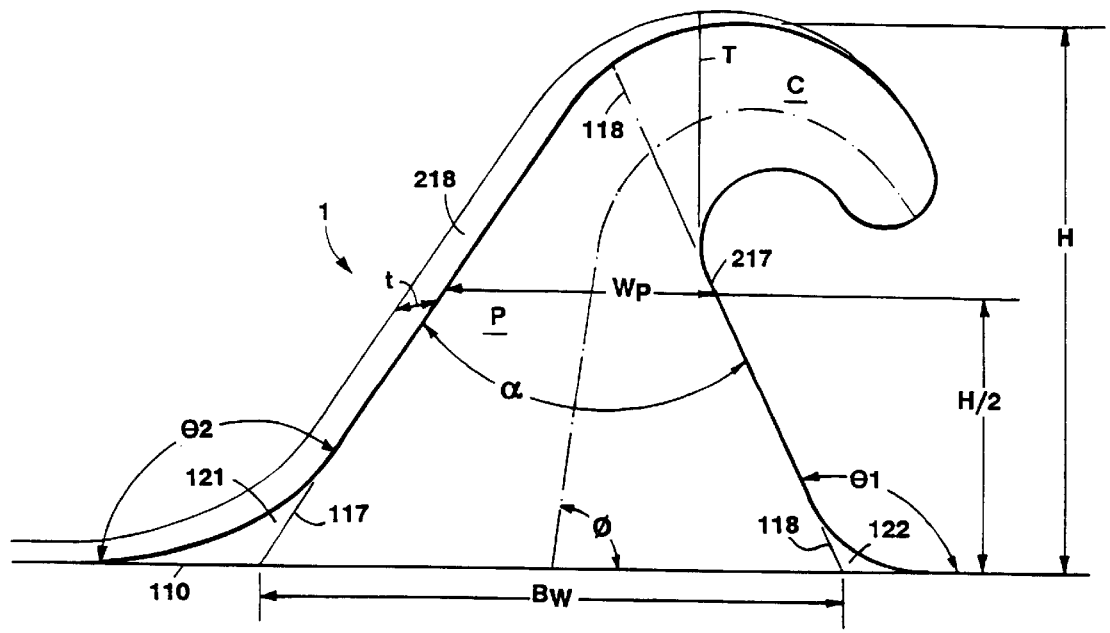
FIGS. 1 and 1A are side views of a mold cavity.
Figure 1A:
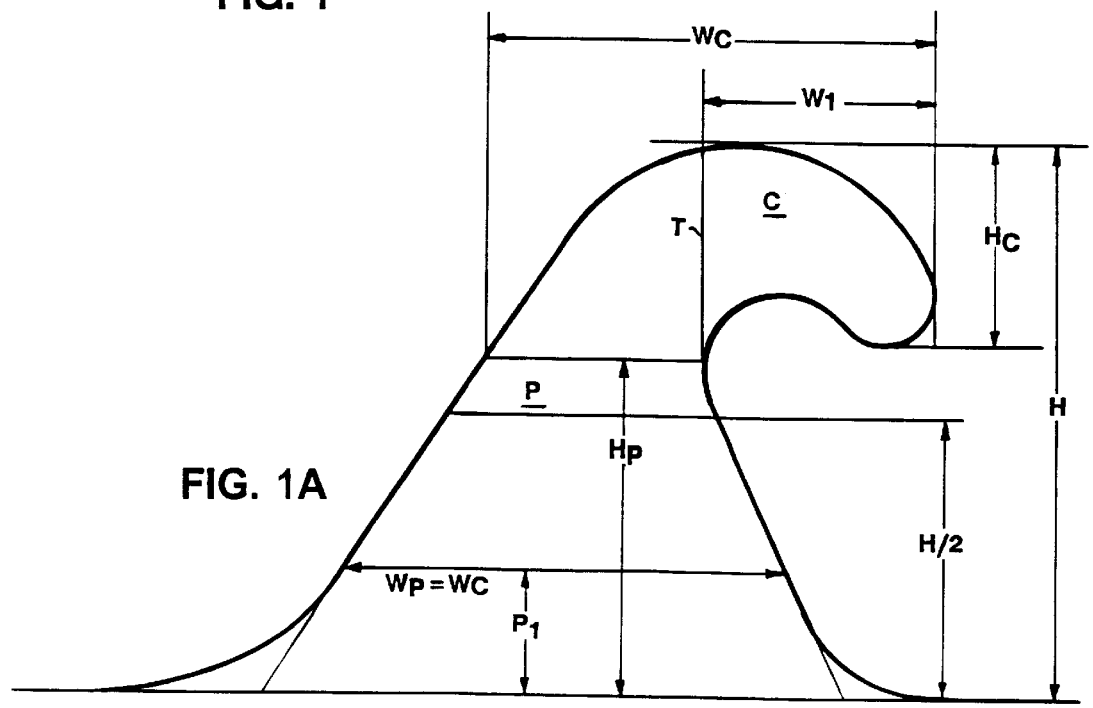

Referring to FIGS. 1 and 1A, the profile of the mold cavity 1 of a preferred implementation of the invention is shown. It defines a pedestal portion or chamber P and a crook portion or chamber C. The pedestal portion has the profile of a broad based triangle, with its relatively straight sides projected to intersect at apex α in the vicinity of the top of the mold cavity. The mold cavity has a total height H and a half height of H/2.

The mold cavity profile has a base width $B_w$, measured between intersections of projections 117 and 118 of the sides of the mold cavity with the base surface 110 of the mold, that is greater than about the height H of the hook element; as shown, $B_w$ is about 110% of the height.

At half height (H/2) of the mold cavity, the pedestal portion has a width $W_p$ about equal to the half height of the hook.

With an apex angle α of about 60°, the pedestal portion continuously tapers from the base (ignoring front and back fillets 121 and 122) at a taper rate of about 1.2 to a point above the half height. The inside surface 217 of the mold cavity then begins to curve to define the lower surface of the crook portion, while the back surface 218 of the mold cavity profile proceeds straight for a further distance. The pedestal portion is considered to end where a tangent T to the inside surface 217 is vertical. Referring to FIG. 1a, the pedestal height $H_p$ is greater than the half height of the hook member.

The crook portion of the mold cavity tapers continually to its tip, though at a much lesser rate than the general taper of the pedestal. In the profile of FIG. 1A, the crook portion continues until its tip portion, directed downwardly, reaches the level of the top of the pedestal portion.

A hook component 100 of a touch fastener in accordance with a preferred implementation of the invention is shown in FIGS. 2, 2A, 2B, 2C, 2D and 3. The hook component consists of a sheet form base 10 and multiple parallel rows of integrally molded hook members 12 extending from the base sheet. Ripstop bumps (not shown), i.e., known raised local regions of the base in the spaces between rows of hooks, may be employed either aligned with the hook members or offset from the hook members, depending upon the intended application.

Corresponding terms will be used to describe features of a hook member produced from the mold cavity. A broad-based, tapered pedestal 13 of the hook member is integrally formed with and extends upwardly from the base 10. The pedestal has a straight sided, pyramidal shape when viewed in side profile (see FIG. 2A). A tapered crook portion 14 is integrally formed with the pedestal. The crook portion arches along a curved axis 15 directly from the top of the pedestal to a tip 16. The tip is adapted to engage a mating fabric.

The width of the crook portion, measured perpendicular to its curved axis (e.g., dimension D of FIG. 2A), continuously decreases from the pedestal to the tip.

The leading and trailing surfaces 17, 18 of the pedestal form angles $\theta_1$ and $\theta_2$ relative to the sheet-form base, respectively, that are substantially greater than ninety degrees. Preferably, $\theta_1$ and $\theta_2$ are between about 110 and 130 degrees. More preferably, $\theta_1$ and $\theta_2$ are about 116 degrees and 125 degrees, respectively. Preferably, when the leading edge and the trailing edge of the hook profile are projected, they intersect at an angle α of at least about 40°, more preferably about 50°, and most preferably about 60° or more. The axis 15 intersects the base at an angle φ that is preferably greater than 80° and more preferably approximating 90°. Forming the pedestal as a truncated, broad-based pyramid when viewed in side profile, such that the edges slant inward toward each other, allows the hook members to be removed more easily from the mold cavity 1 because the crook portion 14 can pass more easily through the portion of the mold cavity in which the pedestal was formed (i.e., through the pedestal chamber). Furthermore, due to the relatively wide pedestal base width, each hook member is able to withstand relatively high shear loads despite the relative thinness of the hook member, which enables higher cross-row densities of the hook members to be achieved. Furthermore, the relatively wide pedestal allows the hook member to better resist bending, thereby maintaining a better grip on the loops.

For use in some important applications in conjunction with non-woven loop members (which may be only 0.001 inch in diameter and 0.0005 to 0.0020 inch tall), the hook members are generally quite small. Height 130 of hook members 12 is preferably less than about 0.020 inch, with 0.0150 inch or less being preferred for microhooks. Furthermore, the pedestal base width 19 for hooks of about 0.015 inch height (i.e., the width of the pedestal, taken parallel to base 10 at the level where the pedestal joins the base, disregarding fillets 21 and 22) is preferably between about 0.010 inch and about 0.025 inch, with about 0.0170 inch presently being most preferred.

Figure 2C:
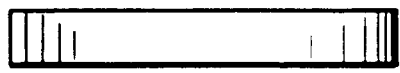
FIGS. 2A, 2B, 2C and 2D are side, end, top and perspective views, respectively, of a hook member.
Figure 2A:
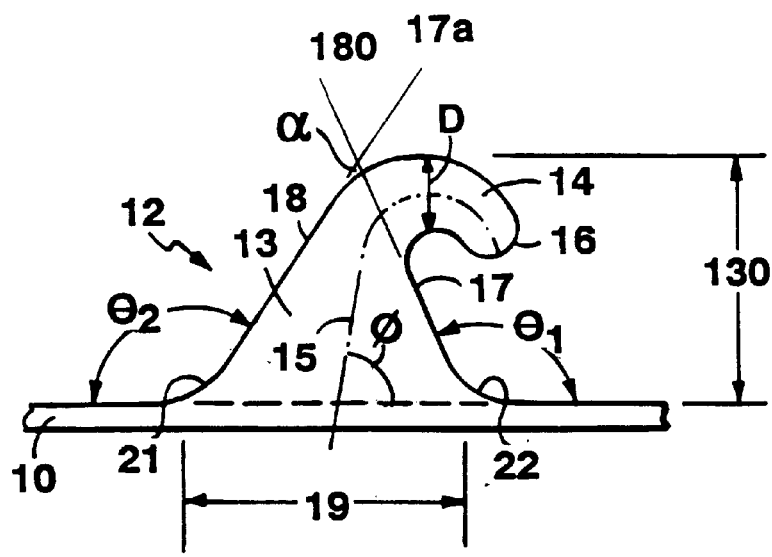
Figure 2B:
Figure 2D:
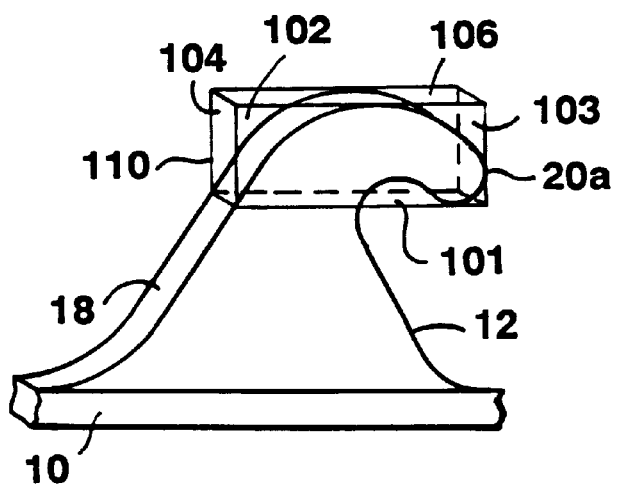
Figure 2:
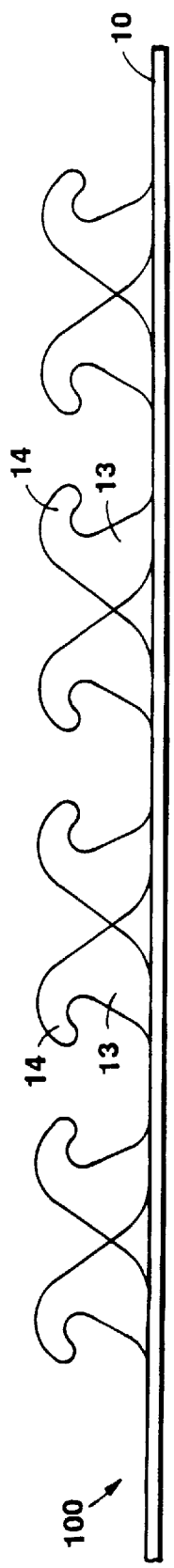
FIGS. 2 and 3 are side and top views, respectively, of a hook component.

Referring to FIG. 2D, the hook member has a displacement volume defined by a parallelepiped 110 having a bottom plane 101, first and second side planes 102, first and second end planes 103, 104 and a top plane 106. The bottom plane is oriented parallel to the base and tangent to the tip. The top is parallel to the base and tangent to the top of the hook member at the point where the hook member achieves its maximum distance from the base. The side planes lie in the planes of the sides of the hook. The first end plane 104 is perpendicular to the bottom plane at the point where the bottom plane intersects the hook member at its trailing edge 18. The second end plane 103 is perpendicular to the bottom plane and tangent to the outermost portion of the crook. The mold cavity has a crook height $H_c$, a crook width $W_c$ and a thickness, t. The displacement volume DV of the crook portion of the hook member formed in the mold cavity is calculated as $DV = W_c \times H_c \times t$. The hook member has a displacement volume of less than $1.0 \times 10^{-6}$ inch$^3$ and preferably about $0.5 \times 10^{-6}$ inch$^3$ or less.

Referring to FIG. 1A, the crook projection, i.e. the distance the crook portion projects laterally from the top of the pedestal is shown as $W_1$, which is greater than 40% of the crook width $W_c$.

This profile also satisfies the preferred constraint that the height $P_1$ of the pedestal, at which the pedestal width $W_p$ is equal to the width $W_c$ of the crook portion, is at a height greater than 30% of the height $H_p$ of the pedestal.

Numerous advantageous implementations of the profile can be employed to realize microhooks of height less than 0.020 inch and displacement volume less than $0.5 \times 10^{-6}$ inch$^3$. In one specific implementation, a hook member having an overall height H of 0.015 inch is provided. The width $W_c$ of crook portion is 0.013 inch, the height $H_c$ is 0.005 inch, the thickness, t, is 0.006 inch and the displacement volume is $0.4 \times 10^{-6}$ inch$^3$.

Figure 3:
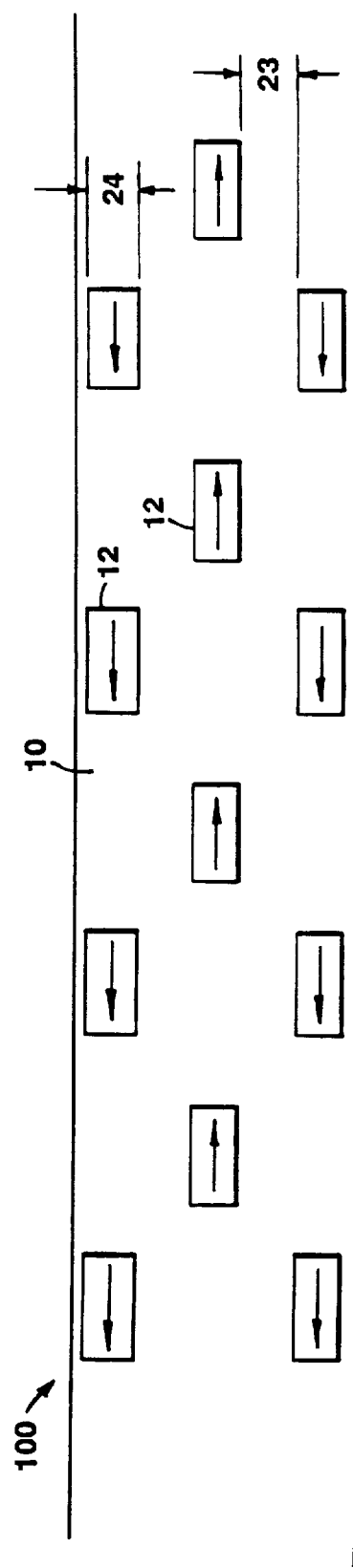

The fastener element 100 or hook strip, including the hook members, is advantageously formed using the Fischer process, U.S. Pat. No. 4,794,028, fully incorporated herein by reference, in which the mold cavities for rows of hook members are formed in the peripheries of corresponding disk-form mold plates, the plates being stacked alternately with spacer plates that form the flat sides of the hook members, with strengthening formations of bumps formed in the spacer plates that can add strength to the hook strip. In a preferred implementation as shown in FIG. 3, in the machine direction (i.e., the direction in which the strip being formed travels) there are preferably about 24 hook members per lineal inch. The hook members preferably are spaced apart laterally (i.e., in the cross machine direction) a distance 23 of about 0.008 inch, and the pedestals 13 preferably have a thickness 24 of about 0.006 lineal inch. This yields a density in the cross machine direction of approximately 71 fastener elements per inch. Hence, there are preferably on the order of 1700 hook members per square inch.

Figure 4:
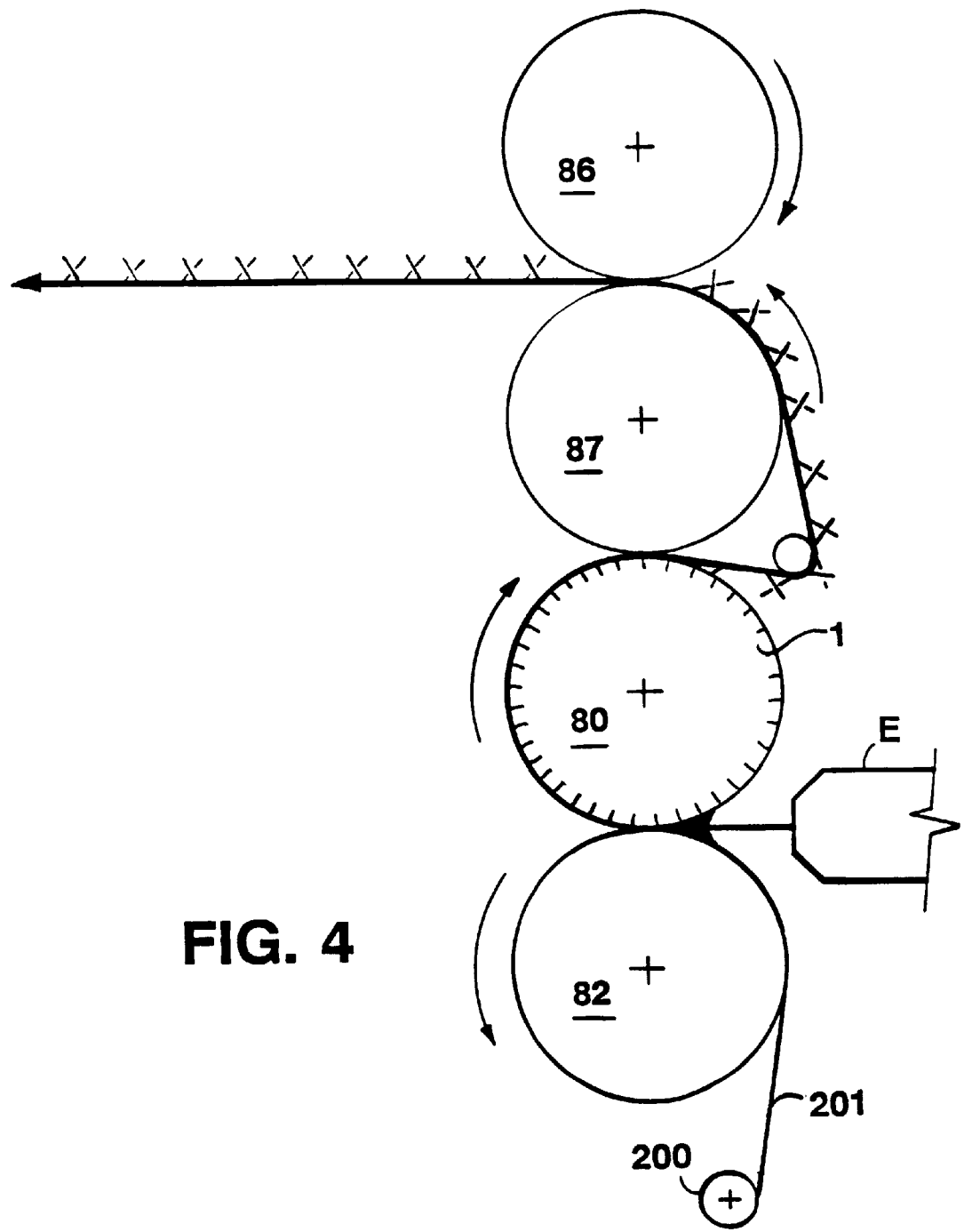
FIG. 4 is a schematic view of a system of forming hook members using a mold roll and a pressure roll.
Figure 4C:
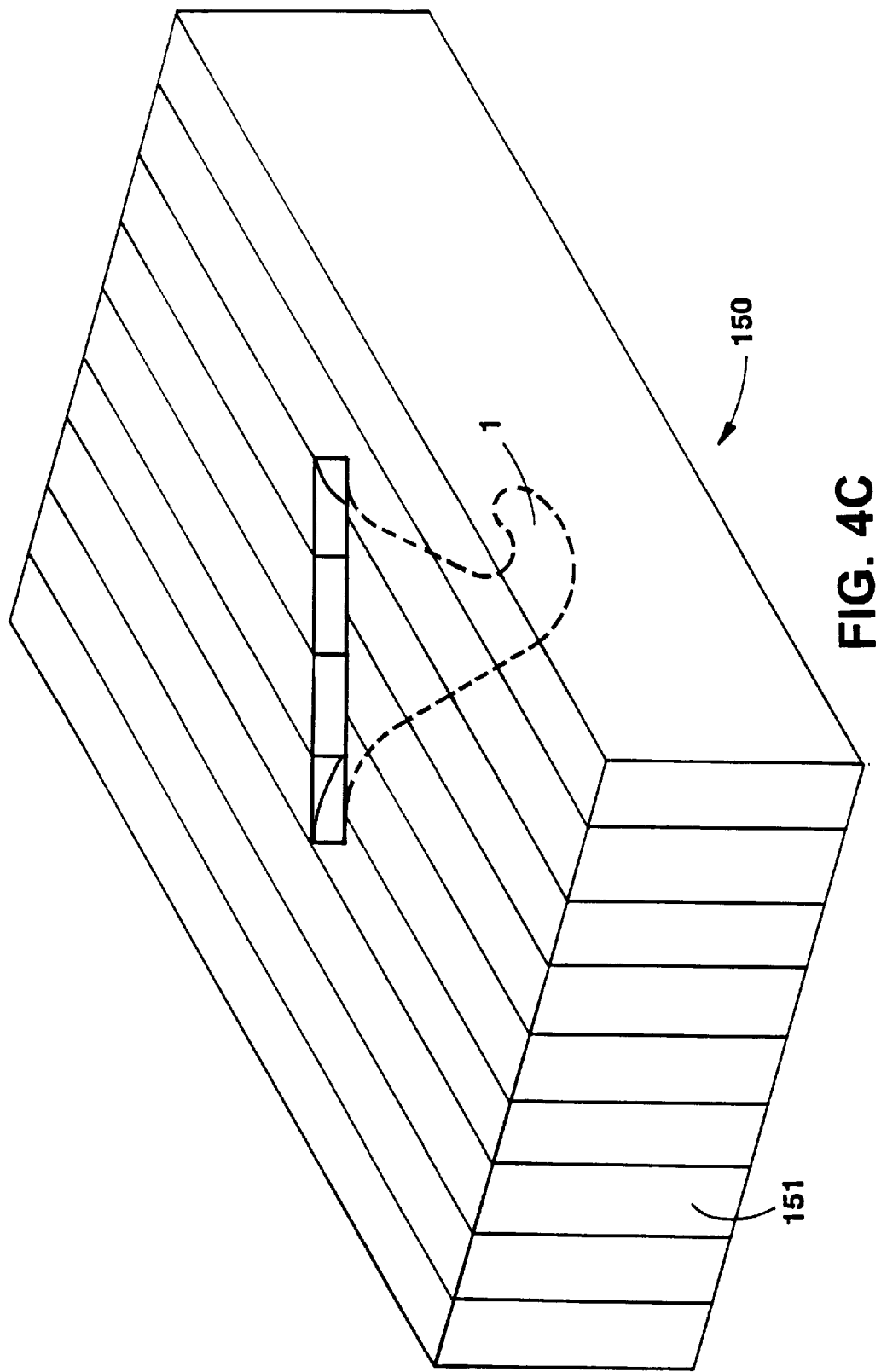
FIG. 4C is a perspective view of an injection mold showing the orientation of a mold cavity diagrammatically.
Figure 4D:
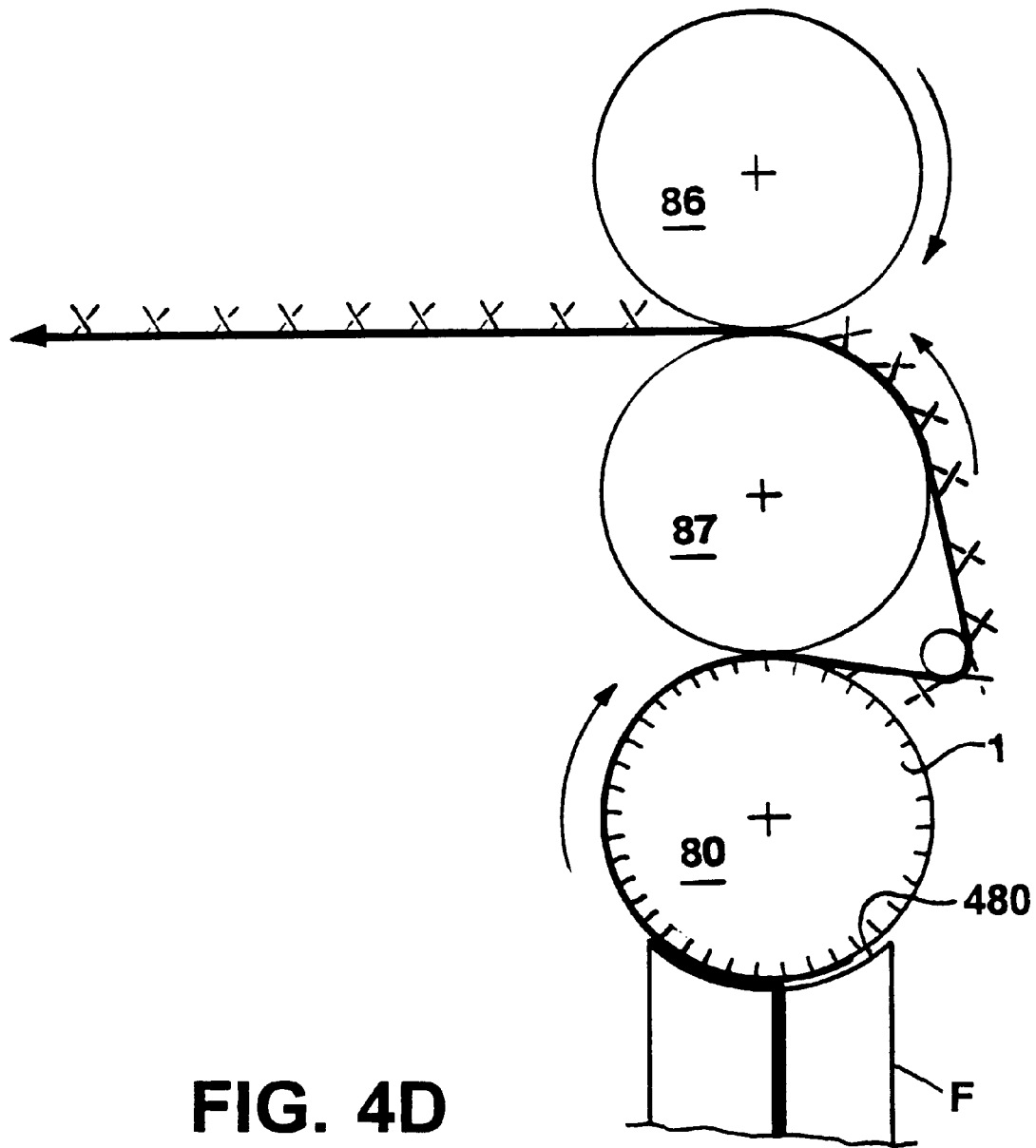
FIG. 4D is a schematic view of a system of forming hook members using a mold roll and an extrusion head.
Figure 7E:
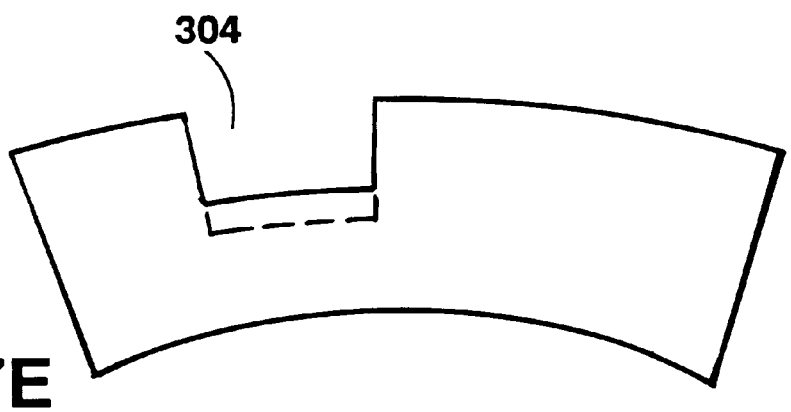
Figure 7F:
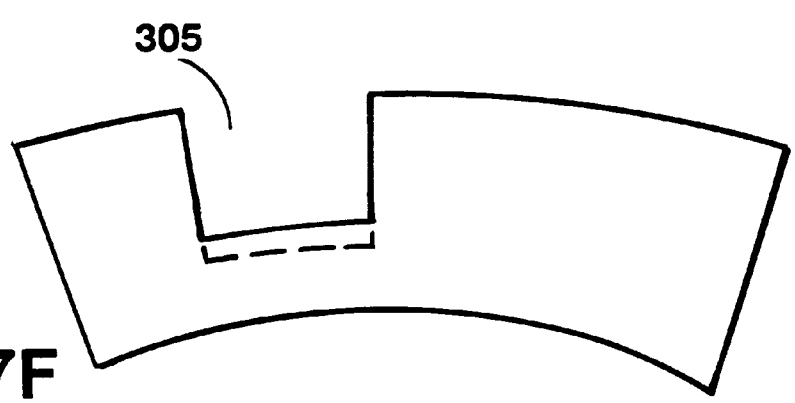
Figure 7G:
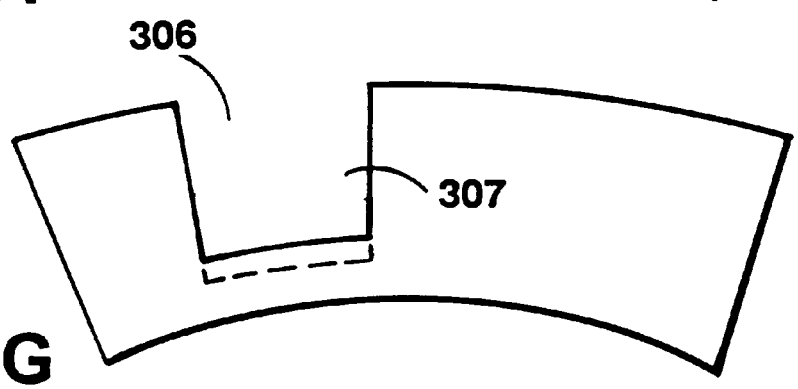
Figure 7H:
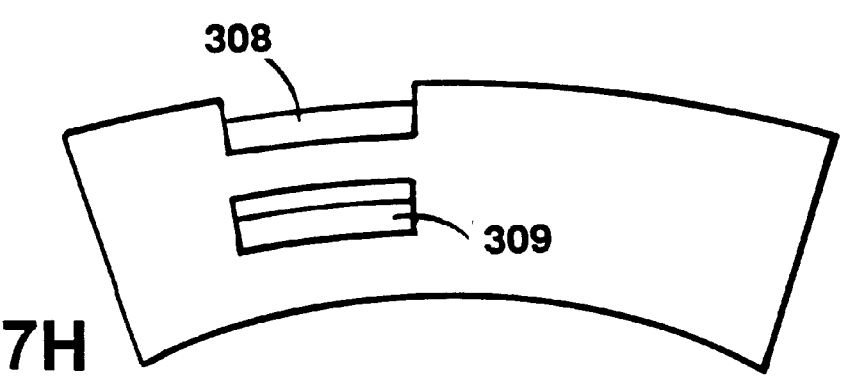
Figure 7I:
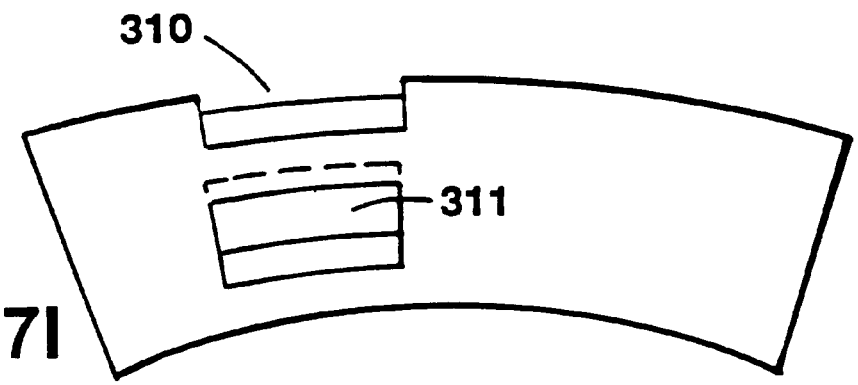
Figure 7J:
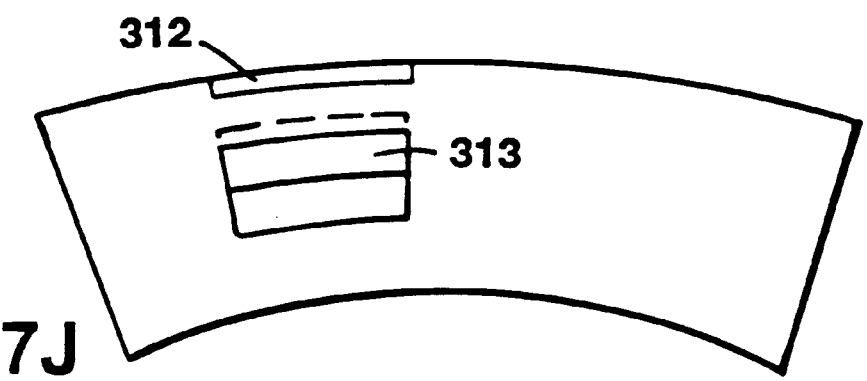
Figure 7K:
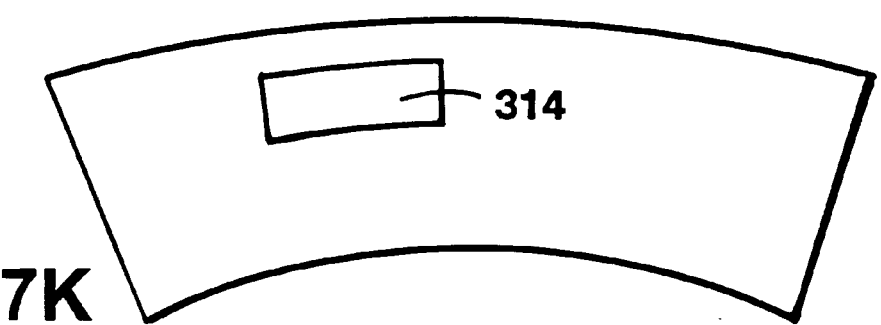

As shown in FIG. 4, a preferred method for making such molded hook members entails extruding molten resin into the nip formed between a cooled mold roll 80 and a pressure-applying roll 82. The cooled mold roll has mold cavities 1 about its periphery that are configured to produce hook members, and cooling channels 83 along its length for circulating liquid coolant. A backing sheet 201, such as a woven or non-woven fabric, may be supplied from a backing sheet roll 200 to the nip. This backing sheet may contain loops adapted to engage the hook members. The resulting fastener element will then include hook members bound to the backing sheet in what may be termed an in situ laminating process, producing a laminated (i.e., bonded together) hook product. As an alternative to using a pressure roll, FIG. 4D shows an extrusion head F for presenting resin to the surface of the mold roll 80 under pressure. Head F has a contoured surface 480 that is spaced apart from the surface of the roll to form the base of the hook product.

Referring to FIGS. 4A and 4B, the mold roll comprises a series of disc-form plates or rings 250 mounted upon a cooled central barrel 251. The rings are pressed together axially to form a cylindrical surface. Spacer rings are disposed between the tool rings. The mold cavities are disposed at the periphery of the tool rings between the spacer rings. The mold cavities, and any bump or other formation cavities in the spacer ring, are provided in a predetermined relationship to provide hook members on the base in a desired relationship, as the particular application requires. As shown, the mold roll is comprised of rings. However, circular plates, having molds at their periphery and cooling chambers running through the plates, can also be employed.

Because the hook members face in opposite directions, the hook members in half of the columns are oriented along the direction of travel of the fastener element, and the hook members in the other half of the columns are oriented opposite to the direction of travel of the fastener element. As shown in FIG. 5A, a sequence showing the removal of a hook member 12 from a mold cavity 1, the hook members that are oriented against the direction of travel can leave the mold cavities of the mold roll without significant bending. However, as shown in FIG. 5B, the hook members that are oriented along the direction of travel must bend around the edges of the mold cavities as they are extracted from the cavities. This deforms them slightly, causing them to extend higher from the base sheet and at a slightly steeper angle than the hook members that are oriented against the direction of travel. Due to the very small size of the hook members, there has been a tendency for the prior art hook members to cool and set in the deformed condition. The hook-shaped cavity disclosed, however, provides ample space for the crook to return to the shape of the cavity before the hook member is completely withdrawn from the cavity, thereby reducing the tendency of the hook to set in the deformed condition.

Furthermore, for making the two sets of hook members even more uniform, the hook members may be passed under a knock-down roller 86, the spacing of which, relative to wrap-around roller 87, is adjustable. The knock-down roller may be employed to push any higher or steeper hook members back to the same level, relative to the sheet form base, as the level of the hook members that are oriented in the opposite direction. The knock-down roller 86 is located close to the position where the hook members are withdrawn from the cavities so that the hook members are still slightly soft and permanently deformable when they pass under the knock-down roller and thus retain their new shape.

The mold cavities 1 are shown disposed at the periphery of the mold roll 80 and the moldable resin is delivered to the surface of the mold roll at a nip. It will be appreciated that the moldable resin can be delivered to the mold cavities in numerous ways. For example, the moldable resin can be delivered to the mold roll directly from an extruder. After traveling along the surface of the mold roll, the resin is then pressed into the mold cavities using a pressure roller. In other cases, the extruder is mounted to extrude with pressure against the roll surface, with extensions of the nozzle surface that conform to the roll serving to keep the extruded resin at sufficient pressure to cause the mold cavities to fill with resin.

Other methods for delivering moldable resin to the mold cavities can also be employed. For example, referring to FIG. 4C which is a perspective view of an injection mold showing the orientation of a mold cavity schematically, the moldable resin is injected into the mold cavities 1 which are situated on an injection mold 150, thereby forming the fastener elements by injection molding. The injection mold is formed of a series of plates 151 disposed face-to-face to create a flat (or curved) surface having mold cavities. The mold cavities can be formed in one or more plates. After molding, the overall mold opens, the hooks are withdrawn from the mold cavities as the molded piece is removed, and the overall mold closes for another injection cycle. Injection molding can be employed to form the hook members directly on a rigid backing which, in turn, can be attached to a separate part. Injection molding can also be employed to form the hook members integrally with a part, such that the hook members do not need to be later attached to the part.

The moldable resin may be any plastic material depending on the intended application for the fastener element. Currently, polypropylene is preferred. Nylon, polyesters, polyethylene, propylene, ethylene and copolymers thereof, or other thermoplastic resins, may also be readily employed.

Other important aspects of the invention concern the making of products that employ three or more mold plates that define the mold cavities. This technique is especially useful in forming hooks by the roll molding process that have a cross machine orientation, or in forming hooks that extend cross-wise to the planes of assembled plates in a stationary mold. These plates are preferably formed by specialized photochemical milling techniques. Alternatively, EDM techniques, laser milling or other techniques can also be employed to form the plates.

For example, FIG. 6 is a cut-away view of a mold roll through a radial plane 6—6 of FIG. 4A. Photochemical milling technology or other high accuracy forming techniques, such as laser milling, are employed to form mold cavities that extend in the cross machine direction of the mold roll. As shown, the mold cavity is hook-shaped. However, other shapes can be employed, if it is desired to form other fastener products, or even to form elements that perform other functions.

In FIG. 6, the mold cavity is formed by a plurality of stacked disk-form plates which are assembled face-to-face on the roll axis, thereby defining surface 110 of the mold roll. Each successive plate has material removed a different amount, according to slices taken of the profile of the desired mold cavity, so that only a portion of the cavity is formed in each plate. Typically part of the cavity is formed by a through aperture in one plate, while plates on each side of that plate have cavity portions in at least part of the thickness of the plate.

As shown in FIG. 6, the plates all have the same thickness. According to the invention, however, in certain advantageous implementations the plates have differing thicknesses, based on the intended application of the hook, the desired profile, or the density of the feature formed. In certain applications, the use of plates of differing thickness enables more economical fabrication since fewer plates are required to form the mold cavity. Further, the use of plates of varying thickness in other instances enables efficient definition of the mold shape, or the achievement of curved surfaces of exceedingly small radii and/or smoother transition. In important cases, as the radius of curvature of a feature becomes smaller, thinner plates are employed for better definition of the surface.

The plates may be only 0.003 or 0.004 inch thick or less when forming small hooks. According to the invention, to enable use of very thin plates for forming special features, prior to assembling to form either a stationary mold or roll mold, one or more of the thin and delicate plates are laminated together to create a more rugged master plate that can be readily assembled on the cooled barrel without risk of distortion. The plates may be laminated (i.e., bonded together) by brazing, high temperature, long life bonding agents, or other means.

Returning to FIG. 6, in plate h, for example, the cavity section extends through the entire thickness of the plate in areas 308 and 309. In plate k, the cavity section extends through only a portion 314 of the thickness of the plate, to define the tip of the mold cavity.

In this approach, usually each plate is different from its neighbor and only by the stacking of the plates together is the mold cavity formed. In this way, hook members in the cross plate direction may be produced (cross-machine direction in the case of roll molding).

One can produce by this technique hook members that have flat surfaces. Advantageously, however, hook members are produced that have rounded surfaces in some or all regions, from base to tip. For instance, surfaces at the tops of the hook tips are made to taper to a point to give a wedge-shaped effect to the top of the hook member that assists the entry of the top into the face of a mating fabric.

FIGS. 7A–7K show, in diagrammatic form, a series of cut-away sections of rings that correspond with rings a through k of FIG. 6. Ring a has a small section 300 of the outer edge removed, representing a section of the backside of hook 400. The next ring, b, has a cavity section 301 that forms the next section of the backside of the hook. The cavities through ring h become successively taller to form corresponding sections of the backside of the hook.

In ring h, cavity section 308 forms a section of the pedestal of the hook that is diminished in height, representing the transition toward the other side of the hook. Cavity section 309 forms the beginning of the top of the crook. In the next ring, i, cavity section 310 is diminished to represent the pedestal becoming shorter, while cavity section 311 forms the part of the crook that progresses downward. At ring j, cavity section 312 is the last section of the pedestal, and cavity section 313 approaches the tip of the crook. Finally, in ring k, cavity section 314 forms the actual tip of the hook. Since there is no portion of the pedestal formed by ring k, there is only one cavity section in this plate.

The techniques described enable one to optimize the shape of the selected areas, especially in sections h, i, j and k. FIGS. 8A and 8B thus show an alternate way of creating a mold cavity that, according to a further aspect of the invention, is achieved by photochemical milling. Cavity sections 300–314 in FIG. 7 have straight sides which produce a hook member with flat sides; as a result of the inherent tendency of photochemical milling to form curved surfaces, a hook member (as in FIGS. 8A and 8B) is created that has curved sides rather than flat sides. As the crook is approached in plate H', cavity section 309' not only has curved sides, but has a point to produce a crook of wedge form at its top.

Figure 9A:
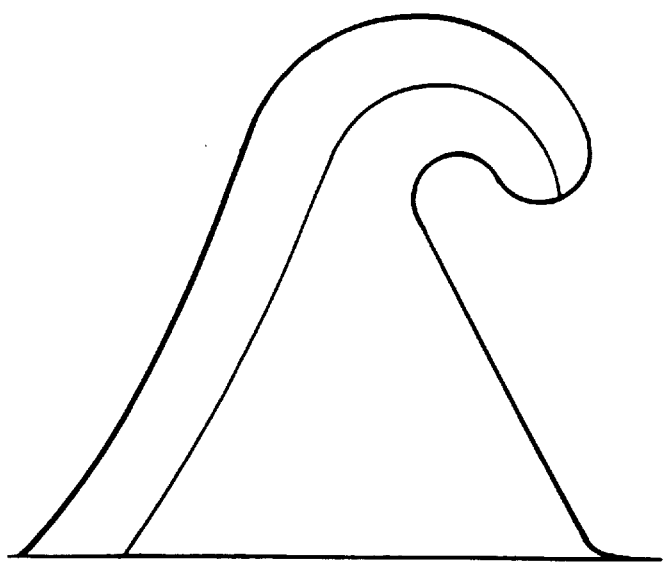
FIGS. 9A and 9B are side and end views, respectively, of a hook member having a wedge at the top.
Figure 9B:
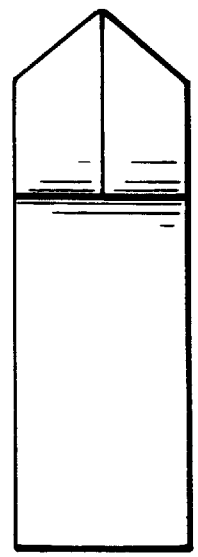

FIGS. 9A and 9B show a hook in which the top of the crook is wedge shaped, created by cavity section 309' such as is illustrated in FIG. 8B. The top of the hook member thus has a two-sided wedge effect to separate the fibers or the filaments of the mating fabric and allow the hook member to penetrate the surface and subsequently engage better into the loops or with the fibers.

FIGS. 10A, 10B and 10C show a hook member which is formed by milling the hook shape by photochemical milling techniques into one ring, and defining the cavity with the milled ring and a flat ring. The hook member is curved on one side and flat on the other. Consequently, a one-sided wedge is formed at the top of the hook member to better penetrate loops.

The techniques just described, of creating curved surfaces to the hooks to form top wedges or smooth non-abrading surfaces, are applicable to formation of hooks that extend, as desired, in either the direction of the plate (machine direction for roll molds) or across the plate (cross-machine direction for roll molds).

An advantage of making hook members in the manner just described, in which the hook member is aligned in the cross machine direction of the mold roll, concerns the manufacture of apparel. A tape of conventional hook form is often employed in an orientation that does not point the hooks in the optimum orientation. Molding hooks in a cross machine direction, for such cases, enables the points of the hooks on the tape to be directed to optimize the engagement into the loops or with the fibers.

The sectioned technique described with respect to FIGS. 6–8 advantageously enables hooks of different size and shape to be created which vary along the length of the product to accommodate the conditions of various uses of the fastener. Advantageously, the hook sizes and shapes are likewise varied around the circumference of the tooling as suggested in FIG. 10. Likewise, in certain advantageous circumstances, the sizes of the hooks are varied in the machine direction. Thus one achieves hooks of different sizes extending in both directions, interspersed with each other, according to a predetermined pattern. In certain implementations, adjacent hooks lie at 90 degrees to each other in a repetitive pattern in both directions. Also, according to predetermined patterns, machine direction hooks are alternated with cross machine direction hooks to reduce the sensitivity of the product to orientation.

Figure 11A:
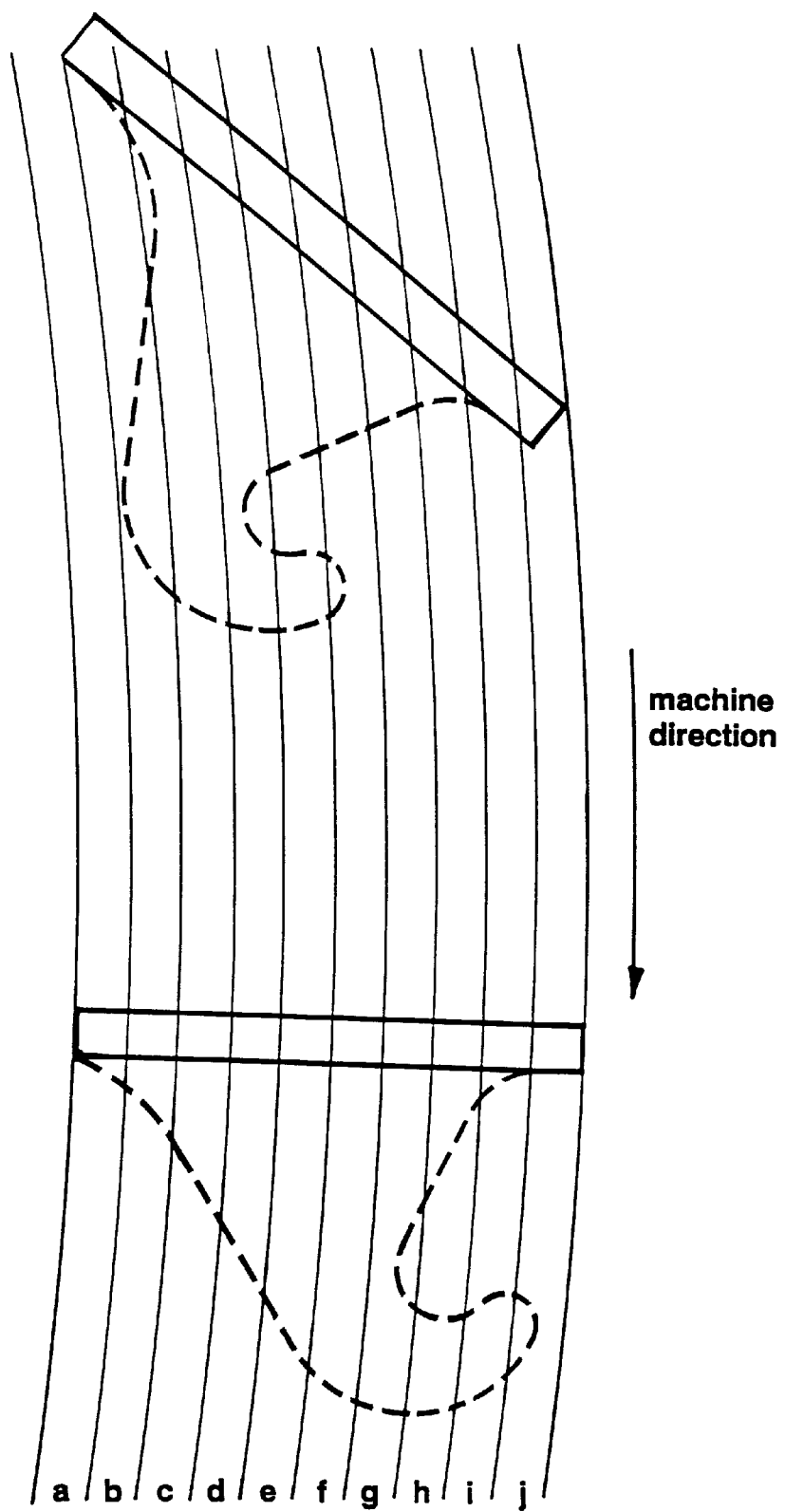
FIGS. 11A and 11B are diagrammatic, perspective views of the surface of a section of a mold roll depicting mold cavities having various orientations with respect to machine direction.
Figure 11B:
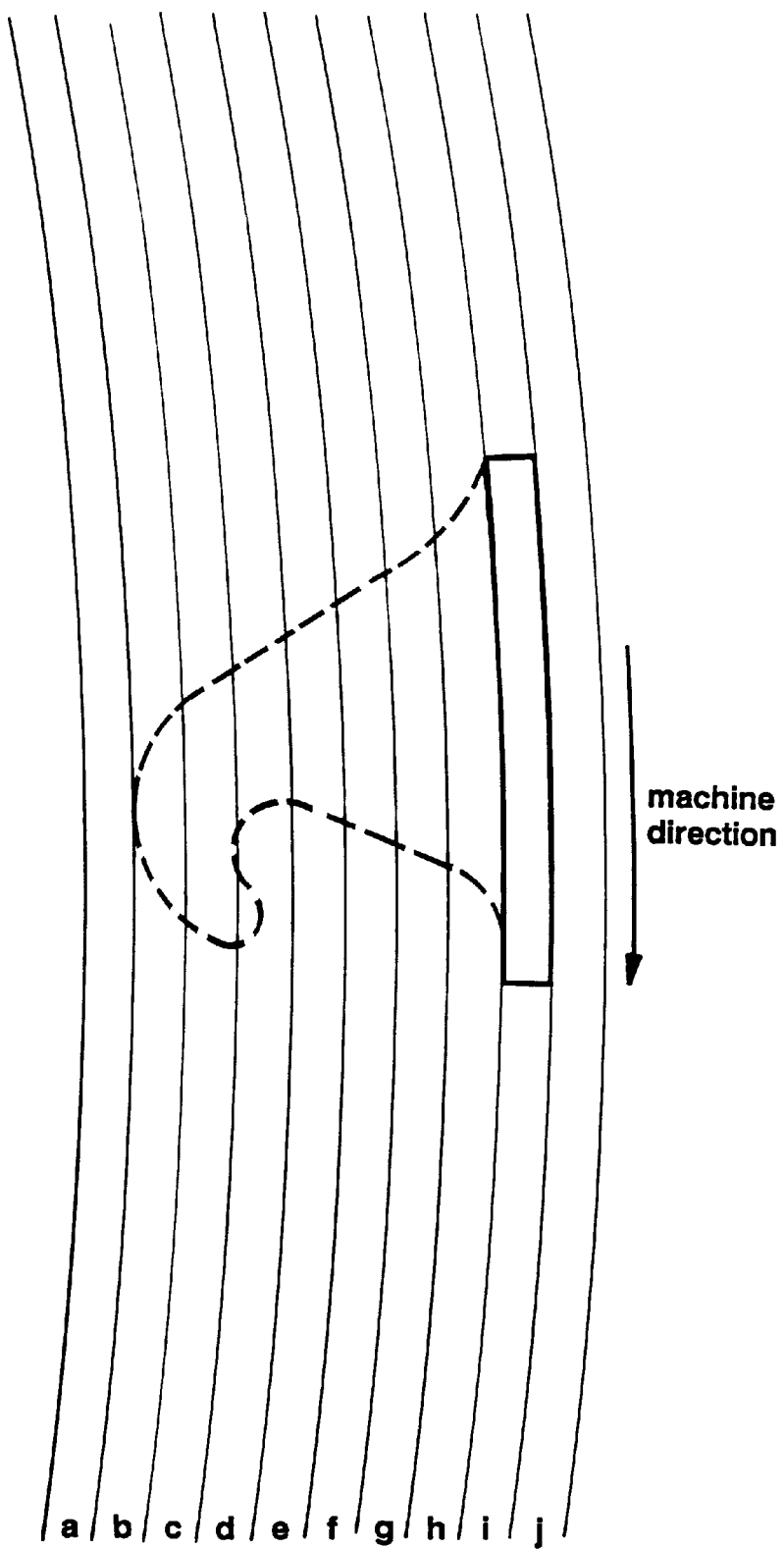
Figure 13:
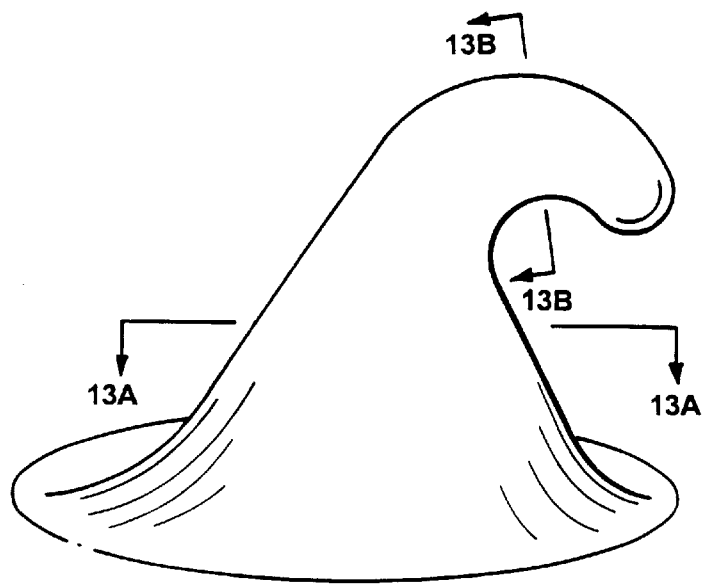
FIG. 13 is a prospective view of a hook member having a circular cross-section.
Figure 13A:
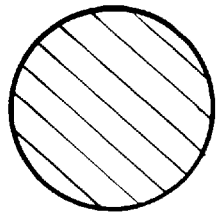
FIGS. 13A and 13B are cross-sectional views of the hook member shown in FIG. 13.
Figure 13B:
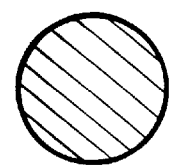
Figure 14:
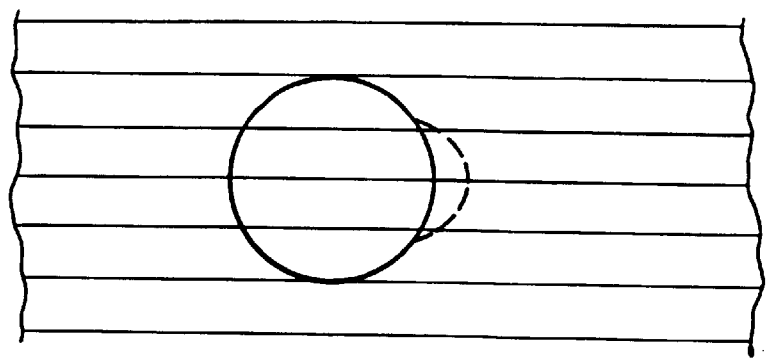
FIG. 14 is a plan view of a mold cavity used to form the hook member of FIG. 13.

Using the techniques just described, the invention also enables hooks to run at an angle relative to the cross machine and machine direction, i.e., in a helical or biased configuration, such that components of the projection of the hook member extend in both the cross machine direction and the machine direction. For instance, in certain embodiments, rings are formed such that the hooks extend at an angle of 45 degrees to the machine direction. FIGS. 11A and 11B, which are perspective views of a section of the surface of a mold roll showing the location and orientation of mold cavities, schematically illustrate these various orientations. Similar orientations (e.g., with-the-plate and across-the-plates orientations) are also achieved for fixed molds.

The present techniques therefore enable practical manufacture of hooks (including hooks with multiple crooks) having various orientations and patterns relative to the machine direction of the mold roll. Palm tree hooks (hooks having two tips), trident hooks (hooks with three tips) and quadra hooks (four-tip hooks) are made feasible by the techniques described herein.

The molding action of the hook shown in FIG. 6 will now be described. In FIG. 6, the same profile that has previously been described in FIG. 1 is shown, rotated 90 degrees relative to the machine direction.

The pedestal base is wide, allowing the hook to demold and spring back to its original shape before it clears the pedestal cavity in order to reduce distortion, as described above. A further feature of the design is that a wide pedestal also is provided in the machine direction. This effectively produces a pedestal that is broad both in the crook direction and at 90 degrees to the crook direction, effectively forming a true pyramid pedestal that tapers inwardly on all four sides.

Figure 12:
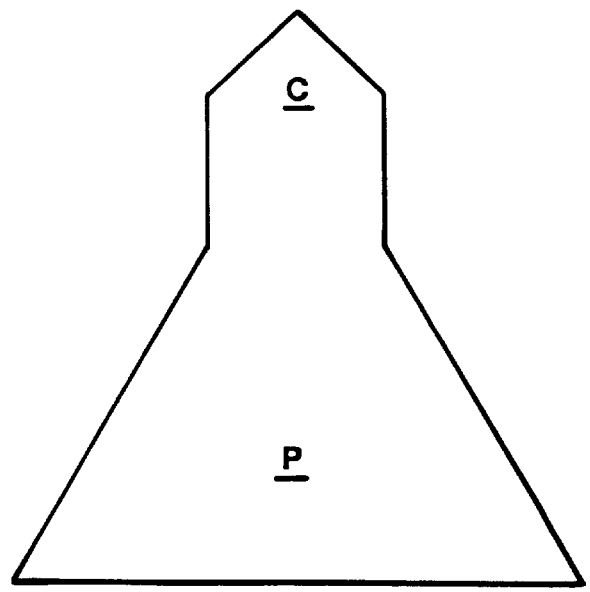
FIG. 12 is an end view of a hook member having a taper running 90° to the profile direction.

FIG. 12 is the end view of a hook member mold employing the section cavities of FIG. 8, but having tapers running 90 degrees to the profile direction (i.e., in end view). In certain advantageous instances, the taper rate is 0.6 to 1 up to 0.8 to 1 or more. In certain advantageous instances, the taper in end view matches the taper in side profile, about 1.2 to 1. This provides a very substantial pedestal which enables the hook member to perform well because it is sturdy and well anchored. Of course, other profiles are made possible by the invention.

The taper shown in FIG. 12 also enables the hooks to be readily demolded. According to the invention, tapers of the pedestal are selectable that simultaneously enable demolding of cross machine hooks, provide a large pedestal cavity for the crook of the hook member to snap back to molded shape as demolding progresses, and provide hooks that are very strong relative to their small overall height.

In addition to enabling production of a pedestal with tapers in both machine and cross machine directions, the techniques are employed to introduce curved surfaces and to create a molded pedestal that is of cone shape as shown in FIGS. 13, 13A, 13B and 14. The conical shape provides a sturdy hook, but with smooth surfaces that in important instances enable the avoidance of abrasion that sharp corners or flat surfaces can produce.

Rounded surfaces of the hook members also in certain circumstances reduce the chance of fatigue fracture as compared to sharp corners. Without sharp corners, such hooks may return to their original shape during disengagement because they do not so readily suffer fatigue. Also such rounded hooks are capable of an increased number of cycles of fastening and unfastening before failure.

Special photochemical milling techniques have novel use in forming the numerous microhooks described above (or submicrohooks to now be described) of conventional and cross-machine orientation.

In the making of a mold for the hook profile shown in FIG. 6, according to this aspect of the invention, photochemical milling techniques are employed. For a given plate, a piece of flat sheet stock is selected from which the mold cavity or cavity section is to be formed. In the case of a mold roll, the sheet stock is sized to form a component disk of the mold roll. The material may be 17-7 PH stainless steel or other suitable metal. A photosensitive media, i.e. a photoresist material, is applied over the plate and is exposed to a radiation (e.g., light) source through a compensating mask so that the photoresist will be removed where it is desired to remove metal to form the mold cavity. The mask blocks a predetermined portion of the light so that the photoresist material is exposed to a predetermined pattern of light. The mask is positioned between the light source and the photoresist material. In particular, the mask may be applied directly to the photoresist material.

Currently, the photoresist material is preferably a positive photoresist material. When exposed to the light, the positive photoresist material cures onto the plate. The remaining portion of the photoresist material which was not exposed to the light is then removed. Alternatively, a negative photoresist material may be employed. When exposed to the light, the negative photoresist material is the portion that is removed. The remaining portion of the photoresist material which was not exposed to the light remains on the plate.

In FIG. 15, the mask is shown in dashed lines, superposed over the profile of the desired hook shaped cavity, shown in solid lines. The portion of the photoresist that is to be removed is within the dashed lines. After the photoresist is exposed to the light, the photoresist is washed away to expose the pattern of the art work. Then the metal sheet is placed in a machine, and the metal not covered by the photoresist material is removed by action of etchant. A spray of etchant (e.g., acid) is employed, as is conventional in photochemical milling. After milling, the portion of the metal plate covered by the photoresist layer remains.

With respect to FIG. 15, regions A–G designate different portions of the shape of the cavity and, diagrammatically, of the compensating mask. In some regions, the dashed line of the compensating mask and the edge of the desired cavity generally correspond, while in other regions they do not.

For straight line regions (e.g., region B in FIG. 15), the edge of the compensating mask generally corresponds to the straight line of the cavity profile that is desired (the shallower the mill depth, the closer the correspondence). However, in curved regions the lines of the mask diverge more substantially from the desired profile. The more radical the curvature is, the greater is the difference between the mask and the desired profile. In areas where the curve of the desired cavity edge is convex, the compensation is to opposite effect to the compensation where the curvature is concave. In general, for etching convex edges, such as at A, the mask is compensated to be undersized with respect to the cavity because the action of the etchant will be relatively concentrated for a given length of cavity perimeter, relative to a straight edge. For concave edges, such as at C, the art work of the mask is enlarged to compensate in the opposite way. At region E in FIG. 15 the surface is even more convex than in region A (i.e. it has a smaller radius), and therefore the compensation is greater, providing more undersizing of the cavity defined by the mask.

The art work of the compensating mask defines points in the regions D and E. The tendency in photochemical milling is for sharp corners to be rounded. In this case, since a small rounded tip shape is desired, the compensated art work comes to a sharp point. Region F is a straight line, similar to region B, and region G corresponds to region A. Thus the art work profile for all regions of curvature of the hook is, in this example, different from the profile of the final hook cavity.

FIG. 15A shows a cross section of the metal after action of the etchant in which advantage is taken of the tendency in the photomilling process to produce a curved rather than a straight surface. This is found to generate a desirable rounded shape, particularly at the edge of the top of the hook. The rounded shape provides a surface that can more readily penetrate the surface of a mating fabric than a flat surface. Further, in important instances, the naturally rounded shape of the surface of the milled plate is exploited to create a smooth curve extending across several adjacent plates.

Selection of the particular compensating techniques for the art work, the photoresist materials, and the etchant depends upon the particular metal being exposed, the depth of metal removal and other conditions, as is well known in the art of photochemical machining. For specific process details, see the technical paper published in 1976 by the Society of Manufacturing Engineers, entitled "Photo-Chemical Machining Fundamentals With Three Unique Applications" by Dr. R. J. Bennett; Photo Chemical Machine Institute publication no. PCMI1000, entitled "What is Photo Chemical Machining Process and What Can It Do For You?"; conference proceedings of The Society of Carbide and Tool Engineers cosponsored by Medicut Research Associates, Inc. and the Abrasive Engineering Society, entitled "Nontraditional Machining Conference Proceedings of the Conference Held Dec. 2 and 3, 1985"; and to the references cited in those papers. The specifically cited papers are hereby incorporated by reference.

FIG. 16 illustrates an alternative compensating mask in which the straight lines and sharp corners are used to provide smooth, small radius surfaces in the produced part. The art work is shaped as small squares near the tip of the hook where a smooth radius of one curvature transitions into a smooth radius of the opposite curvature.

Various techniques are employed to obtain different desired profiles on the plates. For example, in producing cavities or cavity sections that extend through the plates, the plates are advantageously photochemically milled from both sides, thereby reducing the total concavity of the milled surface, and, in certain circumstances where desired, providing an overall convex surface. In certain advantageous instances, the sides of the plate are exposed to the etchant for different amounts of time, creating different shapes at opposite sides of the plate. The etchant liquid is either sprayed at the surfaces to be etched, or directed in a stream to increase its local effectiveness.

Figure 17A:
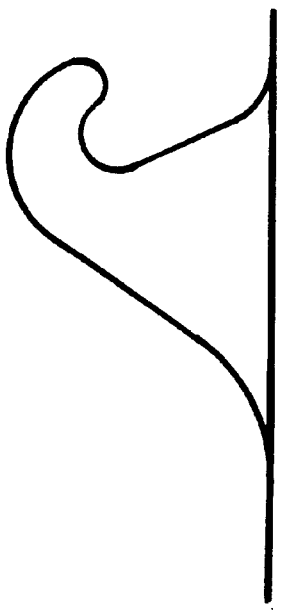
FIG. 17A is a side view of a microhook.
Figure 17B:
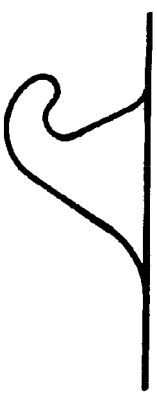
FIG. 17B is a side view of a sub-microhook.
Figure 17C:
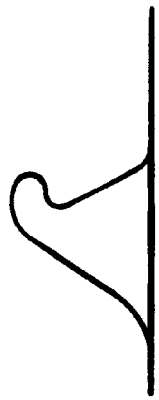
FIG. 17C is a side view of a sub-microhook in which the crook extends essentially horizontally.

Referring to FIG. 17B, a hook element according to FIGS. 2A–2D has an overall height H of 0.008 inch. The radius of the tip surface is approximately 0.0008 inch. This hook is shown in FIG. 17A next to a microhook having height H of 0.015 inch, described earlier, for comparison. Because it is has a height less than 0.010 inch, we refer to the hook of FIG. 17B as a "sub-microhook". It has been advantageously formed in different instances by photochemical milling into the side of a plate to a depth of 0.003 inch and 0.005 inch. The hook element of FIG. 17C is of similar configuration except that the projection of the crook is not as great, and the top of the crook extends essentially horizontally. This profile represents a different trade-off with respect to displacement volume and hook shape that is appropriate in certain circumstances. The displacement volume of the hook member of FIG. 17C is less than that of FIG. 17B because it omits the downward projection of the tip. This form of hook is considered to be useful, for instance, with nonwoven fabrics in which the fibers are tightly bound to the material and present little loft. When employed in close association with rows of hook elements pointing in the opposite direction, the hooks of FIG. 17C provide effective engagement in certain instances.

Photochemical milling enables further important improvements in the shape and capability of loop-engaging hooks and of fasteners as a whole.

For example, referring to FIG. 18, a palm tree style hook 400 has two crook portions 402 extending from a common stem 404, each crook ending in a pointed distal tip 406 at the outermost edge of the crook portion, and having other features that enhance its loop-engaging and loop-retaining characteristics. The dashed line 407 in FIG. 18 represents the neutral axis of one of the crooks 402.

Figure 19A:
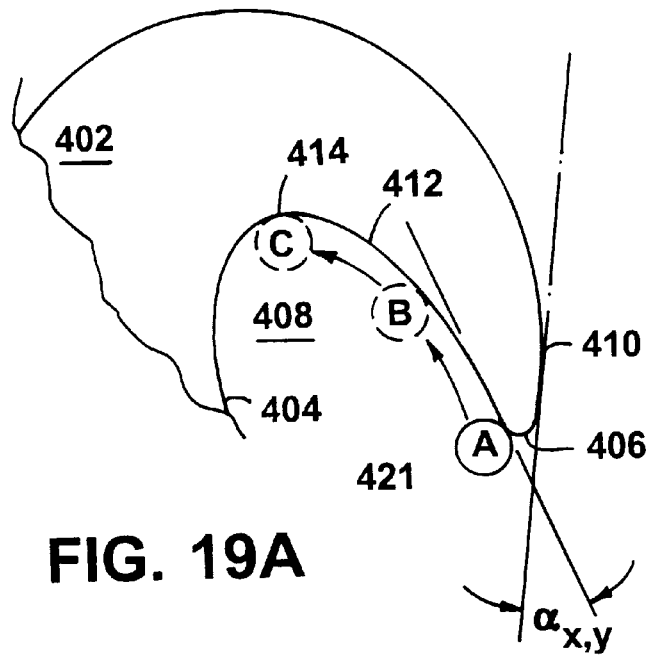
FIGS. 19 and 19A are enlarged, fragmentary views of the distal portion of a crook of the hook of FIG. 18.
Figure 19:
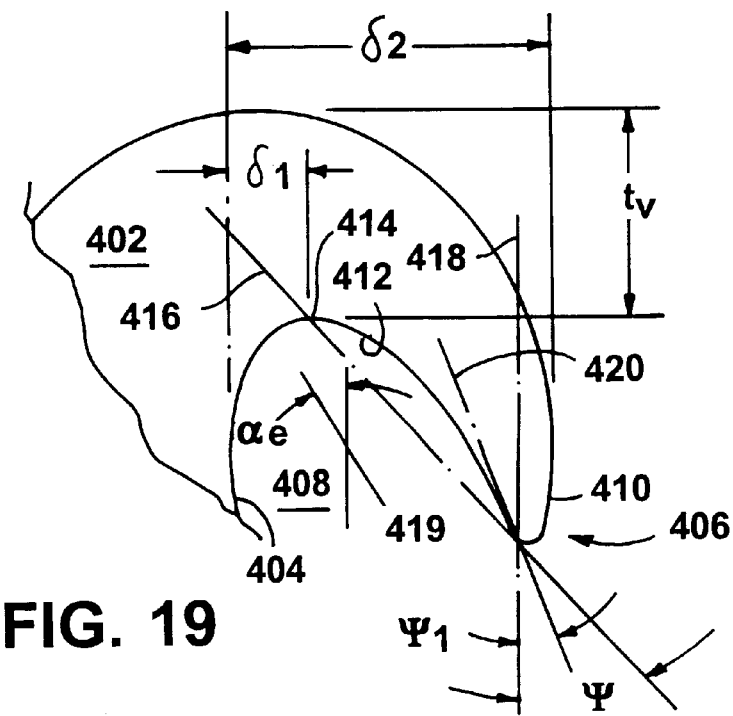

Loop engagement is enhanced by the sharpness of the tip 406 of the crook when viewed in x,y profile, FIG. 19, and in end views, FIG. 21 of a flat sided hook and FIG. 21A of a hook that is symmetrical in the z direction. Tip 406 has a tip radius of about 0.001 inch and forms acute, included angles $\alpha_{x,y}$, $\alpha_z$, and $\alpha_{z1}$, in FIGS. 19A, 21 and 21A, respectively, between the sides of crook portion 402. The sharp tip enables penetration between an engageable loop and the rest of the loop mass of a looped fastener member, such that the loop is engaged in a loop capture area 408 between stem 404 and crook tip 406. Importantly, tip 406 is located very near the laterally outermost edge 410 of crook portion 402, enabling the tip to engage loops that approach the loop capture area from directly above the hook. Improving the loop-engaging probability of an individual hook of a hook fastener member increases the engagement ratio of an array of hooks, that is, the overall percentage of hooks of the array that, at any given time, engage loops. Higher engagement ratios typically result in better fastener performance.

Structuring and locating tip 406 to provide good initial loop engagement, as just described, results in a tip of small cross-sectional area. This provides high flexibility at the tip, giving the tip the capability to "wriggle" in-between loop fibers during mating motion of the fastener components, further increasing the likelihood of loop engagement. Despite such flexibility, the crook structure has features that enable the hook to retain the loop once the loop has been engaged. This is particularly important in applications where the fastening closure, when stressed, tends to separate by deformation of the crook sufficiently to release the engaged loop.

Certain structural features of this embodiment enhance the loop-retaining properties of crook portion 402. For instance, the inner surface 412 of the crook (i.e., the surface from tip 406 to the apex 414 or highest point of the underside of the crook) is steeply angled with respect to the base of the fastener. This helps direct an initially-engaged loop at position A (FIG. 19A, located just inside tip 406) toward stem 402, to regions of the crook portion 404 that have higher bending strength, such as at position C (FIG. 19A). As a measure of the steepness of surface 412, line 416, tangent to tip 406 and extending through apex 414, defines an angle $\psi$ of about 45 degrees with a line 418 through the tip, perpendicular to the plane of the base of the fastener. Surface 412 is also upwardly concave, producing even greater steepness of the underside surface of the crook nearest the tip, such that line 420, tangent to surface 412 nearest the tip radius, defines an angle $\psi_1$ of only about 25 degrees with line 418. The inner surface (412) of the crook portion is preferably of elliptical form, defined by an ellipse having a major axis 419 inclined at an angle $\alpha_e$ of not more than 30 degrees from the base perpendicular.

A common disengagement mode of hook and loop fasteners occurs when tension is applied between mating components in a direction generally perpendicular to the base plane of the components. Under such tension a loop 421 engaged by the tip tends to be moved up steep surface 412 to apex 414 by the applied load, without applying large stress to the crook tip. The lateral distance $\delta_1$ from the engaged loop at apex 414 to stem 404 is small, only about 25% of the lateral distance $\delta_2$ from stem 404 to laterally outermost crook edge 410. By thus urging the engaged loop to apex 414, the loop is better retained under typical loads that tend to induce a bending moment in crook portion 402, because the moment arm is short. Also, the vertical section thickness, $t_v$, of the crook portion at apex 414 is relatively large compared to the cross section of the crook near the tip, $t_v$ being about 65% of lateral distance $\delta_2$. The crook portion of the hook, by its large section thickness, resists "uncrooking" (i.e., bending in the plane of the hook that would move tip 406 away from the fastener base, opening up the underside of the crook).

When engaging and retaining a loop 421, as illustrated in FIG. 19A, the structural features of crook 402 cooperate to secure the loop against disengagement when a nominal load is applied to the loop in a direction perpendicular (normal) to the plane of the base of the fastener. In position A, the vertical load applied by loop 421 to crook 402 is substantially parallel to surface 412, such that very little normal load is exerted by the loop upon the hook. Instead, the loop is moved by the applied load to position B, where surface 412 is not as steep as at position A, but where the crook width, thickness and resulting bending strength are higher and the crook is therefore more able to resist the load applied by the loop without too much deformation. At position B surface 412 is still inclined, such that there still exists a significant component of applied load along the surface that urges the loop to continue to move toward apex 414, the highest point on the underside surface of the crook. Moving from tip 406 to apex 414, the crook bending stiffness and strength progressively increase, due to the structure of the crook. This progressive increase in bending strength cooperates with the gradual decrease in inclination of surface 412 to help crook 402 keep loop 421 retained. The increase in cross-sectional area of the crook, in planes perpendicular to the neutral axis of the crook, preferably increases linearly as a function of distance along the neutral axis from tip 406.

Referring to FIG. 20 (a cross-section corresponding to the embodiment of FIG. 21), crook portion 402 has one flat side 422 and one curved side 424. Sides 422 and 424 meet at a wedge-shaped edge 426 at the top of the hook to provide a good entry profile for penetrating a mass of loops in a mating fastener component. FIG. 20A shows a cross-section of hook 400" of FIG. 21A, as viewed in direction 20 in FIG. 18.

Referring to FIG. 21, the entire length of hook 400, from base to top, tapers in decreasing thickness in the z-direction, out of the plane of the hook. The curved side of the hook is convex, such that its cross-sections, taken along the neutral axis of the hook, are thicker in the center and thinned at opposite edges. Such a shape is particularly suitable to formation with photochemical milling techniques by controlling the depth of etch, in part because etching, as indicated above, normally tends to form curved surfaces, deeper at the center of an area of etch. Tapers that occur both in the plane of the hook and out of the plane of the hook (i.e., "three dimensional" tapers) facilitate hook removal from mold cavities, allowing the product to be removed from the mold with less resistance as compared to hooks that vary in only two dimensions and have opposing flat, parallel sides. Hooks with constant transverse thickness must have a continuously decreasing profile width, in the plane of the hook, to provide draft for demolding. Hooks of the present embodiment, with three-dimensional tapers, can take advantage of a change in transverse thickness and so are not as limited in profile shape for demolding. Movement of the hook out of the plane of the mold, such as by twisting of the stem, during demolding is also enabled by the transverse thickness taper, which can result in less residual demolding deformation of the crook. Some hook profile shapes that have been impractical when limited to having two parallel sides because of demolding difficulties can now also be realized in a practical manner.

FIG. 21 also illustrates the taper of the transverse thickness of the crook in the vicinity of tip 406. The included angle $\alpha_{z1}$, is only about 30 degrees. By thus aggressively tapering the crook thickness in the region where a loop is first engaged, penetration of the loop mat, and fiber engaging properties of the tip, are even more enhanced.

Referring to FIG. 21A, a hook 400' has the profile of hook 400 shown in FIG. 18, and in the z direction is symmetrical, having two equally curved surfaces that meet along line 428. Hook 400' is molded in a cavity formed by two adjacent, photochemically milled plates. The adjacent plates are readily aligned due to the high repeat accuracy of placement of the cavities in the plates and the precise contour of the cavities achieved as a result of the photochemical milling procedure described. This produces a row of hooks with little or no offset step at line 428. Tapering both sides of the hook provides an aggressive cross-sectional area reduction along the hook for demolding of hook profiles that previously have been difficult or impossible to achieve.

Referring to the hook 400" of FIG. 21B, for use where high stem strength is desired, the hook thickness taper is increased immediately below the crook to produce a stem portion having enhanced lateral stiffness. Such gross variations in hook thickness can, by photochemical milling techniques, be accomplished within a single mold ring by varying the depth of etch of the individual hook cavity within the ring, as by multiple masking and etching steps, instead of by aligning cavities in adjacent rings. The smoothness of the transitions in hook thickness achieved from photochemical milling reduces undesired stress concentrations that can occur at sharp corners, and avoids flat, horizontal upper hook surfaces that can resist penetration into dense mats of loops.

Figure 23:
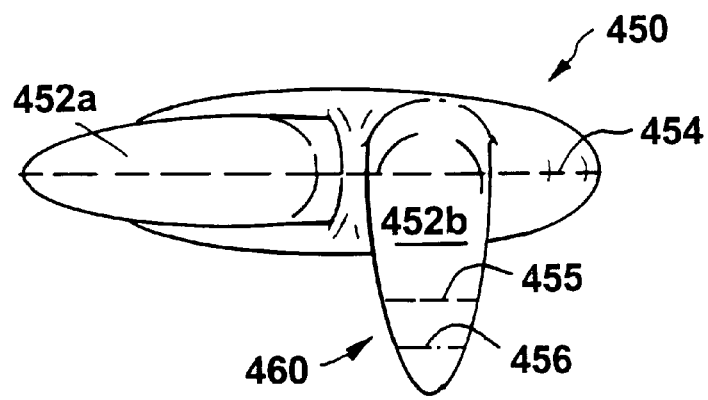
FIG. 23 is a top view the of the hook of FIG. 22.
Figure 22:
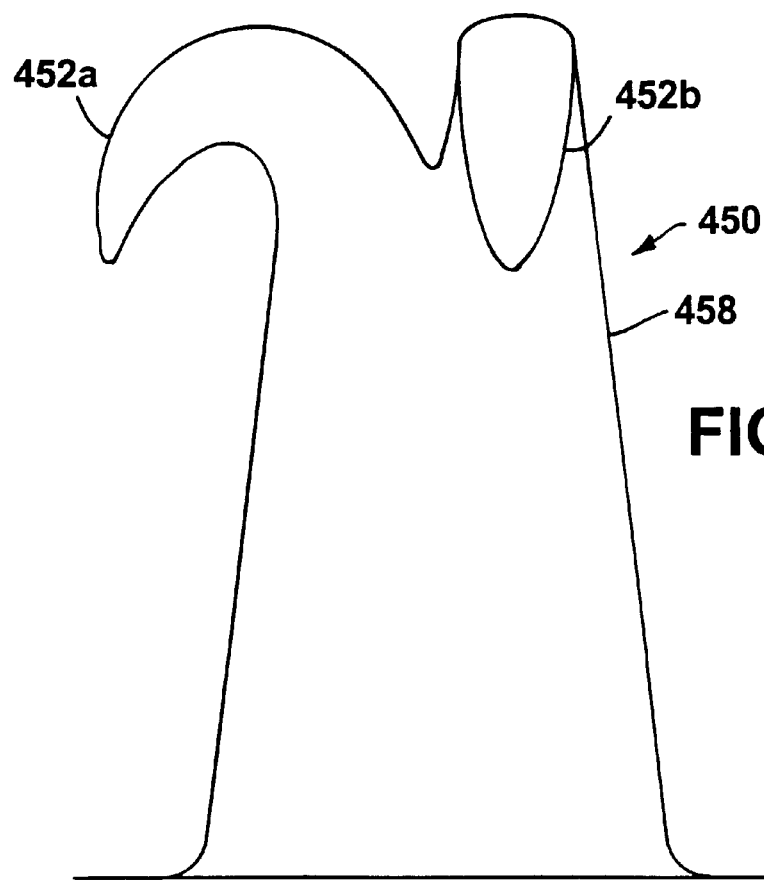
FIG. 22 is a front elevational view of a dual hook with a cross-plate extension.

Employing the highly accurate positioning of cutouts formed by photochemical milling, several new types of hook shapes are featured, having stems or pedestals oriented in the direction of the plane of the plates and cross-machine or cross-plate projections or crooks. FIGS. 22 and 23 illustrate a dual hook 450 having crook portions 452a and 452b that project along different planes. Crook portion 452*a* projects along the plane of the plates, similar to crook portions 402 in FIG. 18. Crook portion 452*b*, however, is directed substantially perpendicular to the plane of the plates and is formed in four adjacent mold plates. The dashed lines 454, 455 and 456 in FIG. 23 show the location of interfaces between plates, illustrating how crook 452*a* and stem 458 are formed in two of the plates, while the distal region 460 of crook 452*b*, including its tip, are formed in third and fourth plates that are thinner than the two plates which form the stem, in order to achieve the finer detail of the tip region of the crook. Because of the precise controllability of photochemical etching, the curved outer surfaces are blended at plate-to-plate interfaces, avoiding sharp cavity corners which may restrain the solidified hook during extraction.

FIGS. 22 and 23 are quite enlarged (the overall height of the hook, for instance, is in some applications less than about 0.025 inches), and precise alignment of adjacent plates is necessary to maintain a desired overall hook form. For instance, if the plate forming the tip of crook 452*b* were to be shifted laterally a mere 0.005 inches with respect to the other plates, crook 452*b* would be tipless. Even a shift of 0.002 inches can create a locked mold condition in which solidified resin can not be withdrawn intact because of a localized break in the monotonicity of cross-sectional area taper from base to tip. Laminating groups of adjacent, hook row-forming plates together in exact alignment to produce a single, thicker plate reduces the potential for misalignment with repeated assembly. This is accomplished by use of high temperature adhesives or brazing to provide a unitary plate forming the complete profile.

In another embodiment, plates of varying thickness are employed, very thin plates being advantageous to employ in regions of radical change in geometry while thicker plates are employed in other regions.

Figure 23A:
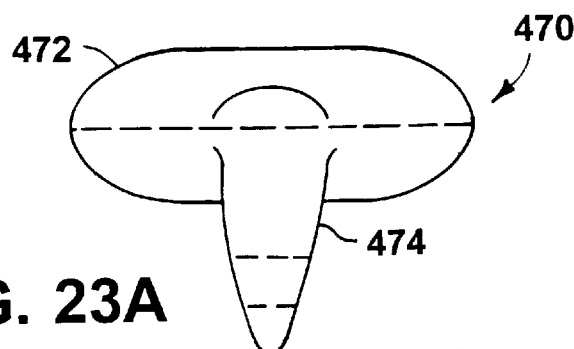
FIGS. 23A, 23B and 23C are top views of other cross-plate hooks with one, three and four crooks, respectively.
Figure 23B:
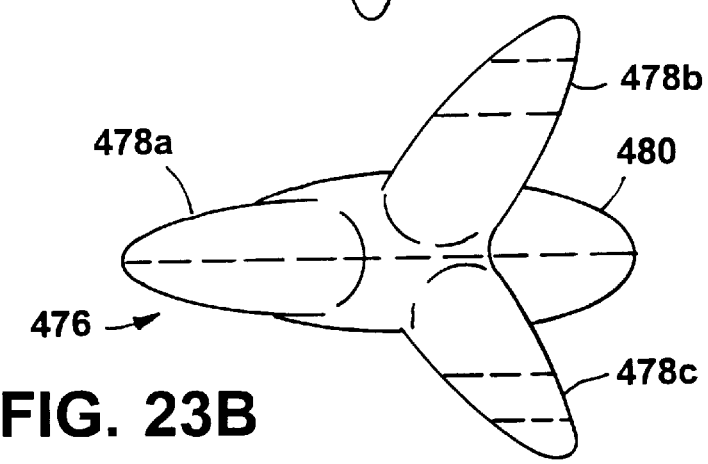
Figure 23C:
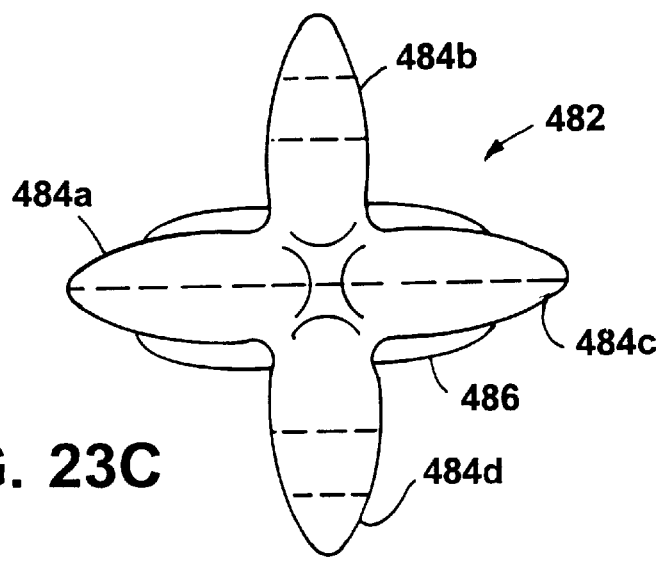

FIGS. 23A, 23B and 23C illustrate other advantageous hook configurations. In each of these figures, dashed lines represent interfaces between adjacent mold plates, as in FIG. 23. FIG. 23A is a top view of a hook 470 having a stem 472 aligned with the direction of the mold plates and formed in two adjacent plates. Extending from stem 472 in a direction substantially perpendicular to the mold plates, crook 474 is formed in four plates, as is crook 452*b* in FIG. 23. FIG. 23B shows a hook 476 having three crooks (i.e., a trident hook) 478*a*, 478*b* and 478*c*, extending from a common stem 480 at 120 degree intervals. FIG. 23C shows a four-crooked hook 482, with crooks 484*a*, 484*b*, 484*c* and 484*d* that extend from a common stem 486 at 90 degree intervals. Hooks 476 and 482 of FIGS. 23B and 23C are particularly well suited for applications with multidirectional loadings, and have overall shapes which were not possible with earlier wire EDM cavity formation techniques. Hooks with even more crooks can also readily be formed by proper configuration and alignment of cut-outs formed by photochemical machining.

To form cooled molds for molding plastic fasteners, especially touch fastener hooks, use of photochemical techniques (etching, milling or machining) of metal mold plates as described above, in particular of copper beryllium alloy mold plates, or use of other highly accurate metal working techniques, such as EDM, electrochemical machining or laser cutting of mold cavities followed by a light photoetch to deburr or smooth the surface, to produce a fine, accurate finish to the mold surface, having few nodules or protrusions, is found to have particular advantage in the manufacture of the fastener products and to the fastener products themselves. It has been found that such surfaces having a surface roughness of less than about 75 microinches, preferably less than about 60 microinches, lead to important new results.

With such a smooth surface in the mold cavities for hooks, for instance, the resin is found to flow more freely to fill the cavities than in present commercial molds that are formed in other ways. This improved melt flow characteristic lowers the pressure required to fill the cavity, and makes it possible to fill the hook cavities more quickly, even if they are quite small or curved and hence quite flow-restrictive. In addition, the smoother cavity surfaces are found to lower the forces required to demold the hooks, which reduces the possibility of permanent hook deformation or distortion. It is found that these features enable higher line speeds when molding hooks using rotating molds in accordance with the Fischer process (See U.S. Pat. No. 4,794,028, or the YKK equivalent, U.S. Pat. Nos. 5,393,475 or 5,441,687, each of which is incorporated herein by reference). Similar advantages are realized by employing such surface finishes for fastener cavities when forming the fasteners by injection molding, or by other molding techniques.

These especially smooth mold surfaces also have been found to unexpectedly reduce tool down-time associated with cleaning the mold plates. In past commercial production, the plastic resin has tended to adhere to the surface of the mold cavities as hooks have been demolded, covering the mold surface with a resin deposit that increases in thickness over time. Ultimately, hook feature definition of the mold cavity is compromised unless the tool is disassembled and cleaned. Current hook-forming mold tools for the Fischer process, for instance, comprise stacks of up to 2000 ring plates or more, typically half of which are hook rings. Various cleaning processes employed are laborious and time-consuming. It has been discovered, with the especially fine surface roughness described, (i.e., less than about 75 microinches,) hooks pull out of the mold cavities with little resistance and there is little resin residue in the cavities. This reduces tool down-time and cleaning frequency, with substantial production cost savings.

It has also been found that the techniques described can be advantageously employed in respect of the outer contour of the edge surfaces of the mold plates, e.g., at the outer diameters of edges of stacked tool rings used in the Fischer process, or of edges of fixed plates used in injection molding. The outer edge surfaces of the plates are the surfaces that, together, form one side of the strip-form fastener base to which the hook or other fastener features are integrally joined. By using mold plates having very low outer surface roughness, a correspondingly fine surface finish can be imparted to the base of the molded component. Higher line speeds are made possible because the molten resin flows readily across such outer mold surfaces to fill the cavities. Consistent tape properties can be realized across the full width of the tape, as, even at high speed, the resin flows and spreads evenly to form a base of uniform thickness. It is realized, for instance, that increases in the production line speed of a continuous molding process of up to 50% or more become possible with mold rolls produced by these techniques, as compared to present day commercial molds produced with traditional EDM methods.

An extremely important further feature of the invention is based on the realization that, despite the presence of the dense array of mold cavities along the edge surfaces of the mold plates, it is possible to maintain, and unusual benefits are obtained by maintaining, high dimensional accuracy in the over-all contour of all the edges of the mold plates. This can be accomplished to good effect using the above described photochemical techniques which have high part-to-part consistency. By proper control of mask tolerances and etching processes, as discussed above and in the cited photochemical technique references, fastener element mold rings with highly concentric inner and outer diameters, and highly circular and accurate outer diameters can, for instance, be produced. While presenting the desired mold cavities, such rings, when stacked on a single mandrel to concentrically locate all of their inner diameters, form a mold roll with a highly accurate cylindrical outer surface.

Diametrical accuracy of a 12 inch diameter mold ring of no more than 0.001 inch, or as little as 0.0005 inch, is found to be possible with such photochemical techniques. By accuracy or tolerance, we mean the variation of a dimension from a mean value.

In another case, after forming hook cavities in molding plates by EDM, laser cutting or photochemical techniques, and after assembling the plates in a stack to form the roll, the roll as a whole is machined to a final diameter within a 0.001 inch tolerance, following which burrs in the hook cavities are removed by a light photochemical etch. Though it might be anticipated that burrs at the edges of the mold cavities might rule out this approach, it is found that the work-hardened nature of such burrs makes them susceptible to rapid chemical etch removal without significant change to the desired contours of the plate edges or mold cavities.

Figure 24:
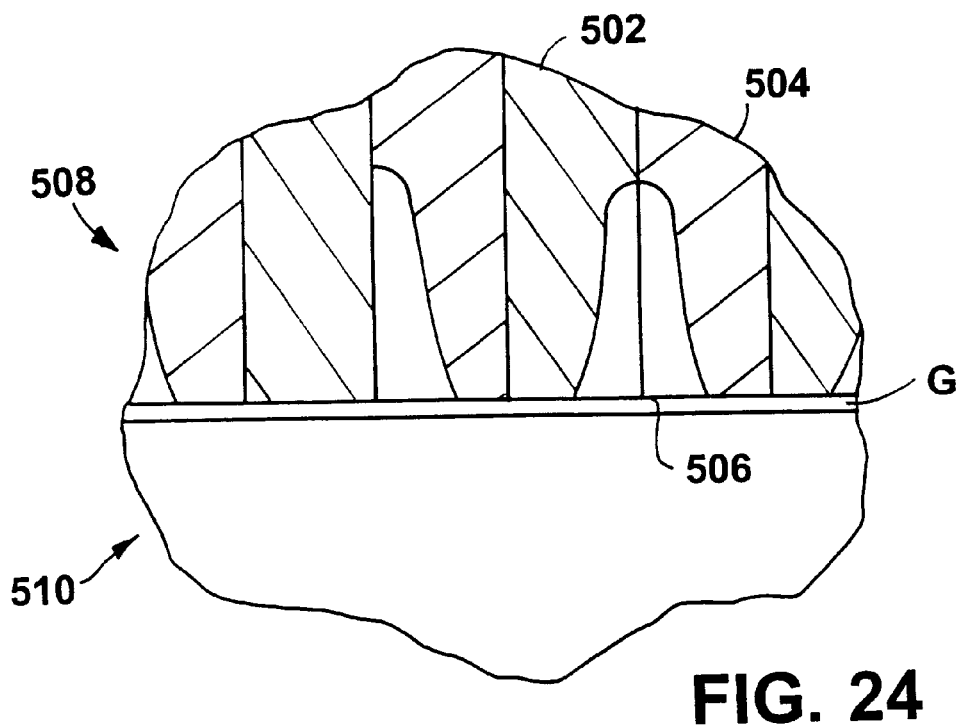
FIG. 24 is an enlarged, fragmentary, cut-away view through the region between a series of mold plates and an opposing member.

Referring to FIG. 24, in either case of construction, precise alignment is achieved of the outer surfaces of adjacent rings (e.g., rings 502 and 504). The finished roll, thus produced, has no detrimental irregularities at the interfaces between the rings (e.g., interface 506), and the result is the production of a uniform hook fastener tape surface and thickness.

It is realized that, by thus avoiding diametrical irregularities at the interfaces between mold rings and maintaining the diametrical tolerance of the mold roll to within 0.001 inch, preferably less than 0.0005 inch, fastener tapes with very small base thickness can be produced, with very significant consequence. Typically, the thickness of the base of a fastener component is limited by the diametrical irregularities of the mold roll because of the potential for undesired contact between mold roll 508 and the pressure roll or extruder head 510 that applies the resin pressure. Finished mold rolls are very expensive, and accidental metal-to-metal contact with the mold roll surface can cause substantial damage to the mold cavities. However, with the dimensional accuracy of mold rolls produced by the present techniques, it has been found to be practical to produce tapes with base thickness, $t_b$, of less than 0.003 inch, preferably 0.002 inch or lower (see FIG. 18).

Such "ultra-thin" hook tapes (i.e., hook tapes with a base thickness $t_b$ of 0.003 inch or less) are found to have unique advantages for hook-and-loop fastening. For a given resin, ultra-thin tapes are much more flexible than tapes of base thickness greater than 0.003 inch, as the stiffness of a tape is proportional to the cube of the thickness of its base. Reduced stiffness greatly improves performance because the thinner hook component is less likely to be accidently disengaged from its mating loop component. For instance, it is found that an ultra thin hook tape has less of a tendency for "beam lift" or "pop-off", which is of particular concern in apparel applications. Beam lift is essentially the tendency of a fastener, when distorted or twisted in a certain way (e.g., in certain diaper applications, when the baby bends over), to become disengaged due to a disparity between the base stiffness of the loop and the hook portions of the fastener. Many loop portions are very flexible. If the hook fastener component is not as flexible, the hooks tend to become locally disengaged as the loop portion buckles and twists and the hook portion remains relatively rigid in comparison. By employing the techniques of the present invention, the stiffness of the loop and hook portions can be made approximately the same. Thus a hook portion can more readily follow the distortions of the flexing of a mating loop portion and remain in contact with it, resulting in better engagement.

Ultra-thin, flexible tapes can also reduce skin irritation in some diaper applications, because of the avoidance of stiff surfaces which can be abrasive to a baby's skin. In addition, because material costs can be a substantial part of the cost of a continuously molded hook fastener tape, cost savings realized from the base thickness reduction of 30% or more of the material in the tape base can be very significant.

In preferred embodiments for ultra-thin tapes, polymeric resins of certain qualities are selected. The resin is selected to have a high melt flow index, for instance, above 5, preferably above 10 and in certain advantageous instances, and particularly with small or submicro hooks, as much as 20 or higher. It is realized that such a high melt flow index resin, to enhance the filling of the hook cavity, has important advantage when using cooled mold plates made of beryllium copper or other highly thermally conductive materials. The high melt flow resin enables the resin to fill small hook cavities rapidly before the resin hardens. This enables better fastener formation and higher line speeds. Additionally, the high melt flow index helps to uniformly distribute the resin across the entire width of the tool, to achieve a highly uniform tape thickness.

Preferably, resin for molding ultra-thin hook tapes is selected to have a tensile yield strength of about 5,000 to 5,300 psi or more to enable the tape to withstand tensile loads induced during high speed demolding and subsequent operations without yielding or detrimentally deforming. Preferably, the resin is also selected to have significant tear resistance or toughness, and an elongation of about 10 percent or more for easier demolding without permanent hook deformation.

Depending upon the application, materials for making ultra-thin hook tapes include, for instance, polypropylene, polyethylene and polyester resins and copolymers thereof, although certain other thermoplastics and even thermosetting resins are useful. Examples of preferred polypropylenes include KC-732-P and E-1120-Z, available from Monell USA and Epsilon Polymers, respectively.

The ability to make thin, strong touch fastener closures at high speed has significant effect upon the cost of such closures and hence their applicability to common packaging applications, to applications requiring large areas of the closures, such as in the building and signage industries, and to use on inexpensive disposable products.

The techniques and arrangements just described provide improved flow, control and shaping of the melted resin. Another aspect of the invention is the specific use of copper-based alloys of high thermal conductivity for the mold plates or rings. A particular aspect of the invention is the use of hardened copper beryllium alloy as the metal of the plates.

High thermal conductivity metal enables rapid cooling of the tiny molded fasteners, while also the contact of the resin of the base of the fastener with the edges of the high conductivity plates during molding leads to rapid heat transfer to the cooling agent, such as internal circulating cooling fluid, that cools the plates. In particular, ultra-thin fastener base layers having base thickness $t_b$ of less than 0.003 inch, and accordingly small thermal mass, are particularly susceptible to rapid cooling. This leads to a further increase in the molding or line speed, attendant decrease in production cost, and hence the applicability of hook fastener products to many applications in which cost has heretofore precluded their use.

Figure 25:
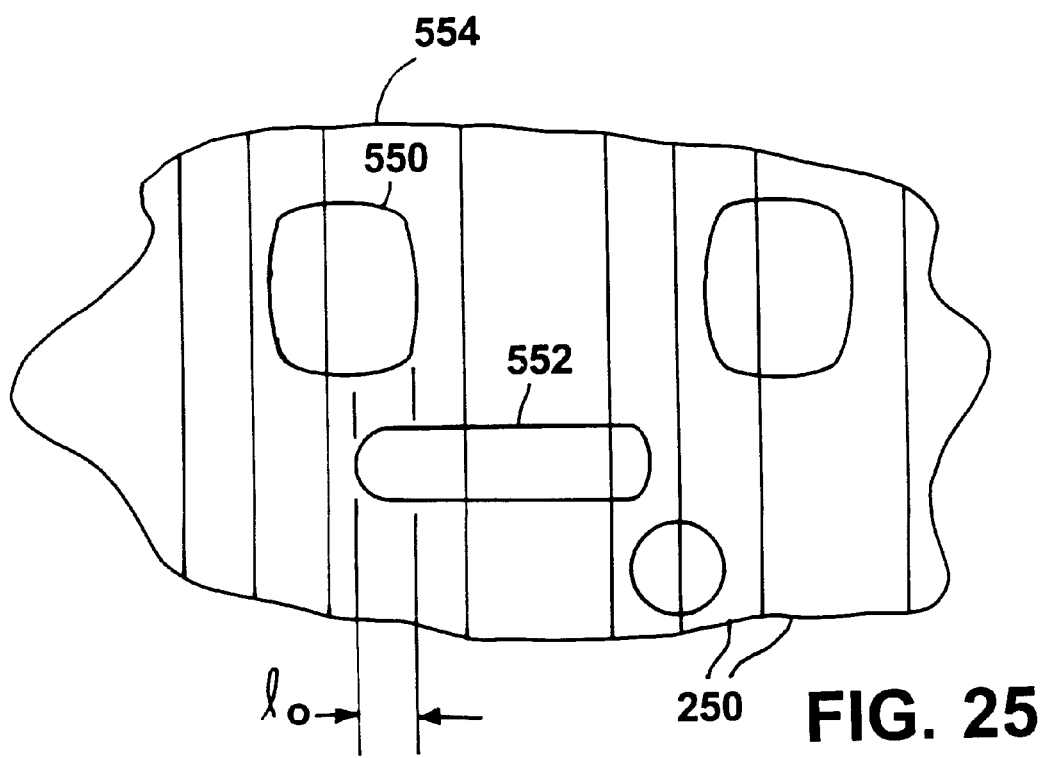
FIG. 25 is an enlarged view of the surface of a mold having an array of different shapes of overlapping mold cavities.

Referring to FIG. 25, mold cavities can be advantageously arranged in new and heretofore impractical patterns, due to the cavity-forming abilities of photochemical etching using the techniques of the invention. For instance, mold cavities can be axially overlapped within a single mold plate, as illustrated by cavities 550 and 552, which overlap a distance $l_o$ in plate 554. Overlapping cavities can produce hook fastener strips with very high hook array densities and high resultant performance. In addition, various arrangements of different shapes of hook fastening members, as indicated in FIG. 25, can be formed in a single mold surface.

It is a fortuitous discovery that copper-based hardened alloys such as copper beryllium provide ideal cooling properties for touch fastener hook molding applications, while enabling ready etchability for forming molds to the special surface finish, dimensional accuracy and small size according to the techniques described above. The ability to photochemically form the rings or to lightly chemically etch the surfaces to remove burrs or to clean the surfaces without significantly affecting the formed contour of the plates is a particular advantage.

Thus it is seen that the material of the mold rings, the specified hook size and finish tolerance, and the special forming techniques for achieving them, and particular geometries of the fastener products, including thin base sections and particular orientations and shapes, lead to a significant unitary improvement in the touch fastener art and in the tooling and methods used in making the fasteners.

It will be understood that many aspects of the present invention are useful in respect to molds that, instead of being fixed, have moving parts that release the molded product.

Other embodiments are within the scope of the following claims.

What is claimed is:

1. In a molded hook for a touch fastener, the molded hook supported by a base, the hook having a stem portion extending from the base, and at least one crook portion integral with and curving laterally from the top of the stem portion, the profile of the crook portion in the plane of the stem portion of the hook tapering along its neutral axis toward a distal tip, the distal tip being spaced laterally from the stem portion to define a loop capture area having an apex, the hook characterized in that:

(a) the distal tip, in said profile of the crook portion, is substantially pointed, defining an included angle of less than about 30 degrees, (b) the neutral axis of the crook portion is directed substantially directly downward toward the base at the distal tip, (c) the curvature of an inner surface of the crook portion decreases in radius from the distal tip to the apex, and (d) the apex of the hook capture portion is located laterally closer to the stem portion than to the distal tip.

2. The molded hook of claim 1 wherein the apex of the loop capture area is spaced from the distal tip a distance of more than about two-thirds, preferably more than about three-fourths, of a lateral distance from an outermost portion of the crook to the stem portion.

3. The molded hook of claim 1 wherein the crook portion has a sharp upper edge defined by the intersection of a flat side of the crook portion and an oppositely directed convex side of the crook portion.

4. The molded hook of claim 1 wherein the crook portion has an upper edge defined by the intersection of two oppositely directed convex sides of the crook portion.

5. The molded hook of claim 1 wherein the inner surface of the crook portion is of substantially elliptical form, defining a major ellipse axis which forms an angle with a normal to the base of less than about 30 degrees.

6. The molded hook of claim 1 wherein the distal tip has a tip radius of about 0.001 inch.

7. The molded hook of claim 1 wherein the distal tip is laterally disposed near a laterally outermost edge of the crook portion.

8. The molded hook of claim 1 wherein the crook portion is structured such that a line extending between the apex of the hook capture portion and the distal tip will form an angle of about 45 degrees with respect to a line extending perpendicularly from the base.

9. The molded hook of claim 1 wherein the inner surface of the crook portion is inclined so as to form an angle of about 25 degrees with respect to a line extending perpendicularly from the base.

10. The molded hook of claim 1 wherein a vertical section thickness of the crook portion at the apex is about 0.65 times a lateral distance between the stem portion and the distal tip.

11. The molded hook of claim 1 wherein bending stiffness of the crook portion increases from the distal tip to the apex.

12. The molded hook of claim 1 wherein cross-sectional area of the crook portion, in planes perpendicular to the neutral axis of the crook portion, increases linearly as a function of distance along the neutral axis.

13. The molded hook of claim 1 wherein the crook portion has one flat side and one curved side.

14. The molded hook of claim 1 having a thickness, measured laterally and perpendicularly to the plane of the stem portion of the hook, which decreases from the base.

15. The molded hook of claim 1 wherein the crook portion has two convex sides.

16. The molded hook of claim 1 having two crook portions extending from a single stem portion.

17. The molded hook of claim 16 wherein the two crook portions extend in perpendicular lateral directions.

18. The molded hook of claim 1 having three crook portions extending laterally from a single stem portion.

19. The molded hook of claim 18 wherein the crook portions extend at 120 degree intervals.

20. The molded hook of claim 1 having four crook portions extending laterally from a single stem portions.

* * * * *

UNITED STATES PATENT AND TRADEMARK OFFICE
CERTIFICATE OF CORRECTION

PATENT NO. : 6,163,939
DATED : December 26, 2000
INVENTOR(S) : Thomas G. Lacey, George A. Provost, Scott M. Filion, Evangelos Kaparis, Clinton Dowd, James Van StumpF, Mark J. Condon, Samuel W. Pollard, Stephen C Jens, Peter E. Grulke Page 1 of 1

It is certified that error appears in the above-identified patent and that said Letters Patent is hereby corrected as shown below:

Claim 2,
Delete [preferably more than about three-fourths,].

Claim 20,
Delete [s] after "portion". (second occurrence)

Signed and Sealed this

Fifth Day of March, 2002

Attest:

Attesting Officer

JAMES E. ROGAN
Director of the United States Patent and Trademark Office